(12) United States Patent
Miyazaki et al.

(10) Patent No.: US 10,616,433 B2
(45) Date of Patent: Apr. 7, 2020

(54) IMAGE PROCESSING DEVICE

(71) Applicant: BROTHER KOGYO KABUSHIKI KAISHA, Nagoya, Aichi (JP)

(72) Inventors: Sadaaki Miyazaki, Nagoya (JP); Tetsuya Okuno, Nagoya (JP); Toyoshi Adachi, Kakamigahara (JP); Katsunori Enomoto, Toyokawa (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 523 days.

(21) Appl. No.: 15/007,384

(22) Filed: Jan. 27, 2016

(65) Prior Publication Data
US 2016/0216864 A1    Jul. 28, 2016

(30) Foreign Application Priority Data

Jan. 27, 2015   (JP) ................................. 2015-012994
Jan. 27, 2015   (JP) ................................. 2015-013503
(Continued)

(51) Int. Cl.
*H04N 1/00*        (2006.01)
(52) U.S. Cl.
CPC ..... *H04N 1/00941* (2013.01); *H04N 1/00204* (2013.01); *H04N 1/00411* (2013.01); *H04N 1/00503* (2013.01); *H04N 2201/0094* (2013.01)
(58) Field of Classification Search
CPC ........... H04N 1/00941; H04N 1/00204; H04N 1/00411; H04N 1/00503; H04N 2201/0094
See application file for complete search history.

(56) References Cited

U.S. PATENT DOCUMENTS 5,726,883 A * 3/1998 Levine .................... G06F 3/033
                                                               700/83
6,493,770 B1 * 12/2002 Sartore ................... G06F 13/10
                                                               710/8
(Continued)

FOREIGN PATENT DOCUMENTS

JP    2004-046802 A    2/2004
JP    2009-260903 A    11/2009
(Continued)

OTHER PUBLICATIONS

Japanese Official Action dated Jan. 8, 2019 received in related application JP 2015-223788 together with an English language translation.

*Primary Examiner* — Stella Higgs
(74) *Attorney, Agent, or Firm* — Scully, Scott, Murphy & Presser, P.C.

(57) ABSTRACT

An information processing device may activate a first application program for providing a first function corresponding to a first item image, in a case where the first item image is selected from among N1 pieces of item images in a first item selection screen, under a non-connection state in which a storage device that stores program control data is not connected to the information processing device. The information processing device may activate a second application program for providing a second function, in a case where a second item image is selected from among N2 pieces of item images in a second item selection screen, under a connection state in which a second storage device that stores first program control data is connected to the information processing device, and display a function related screen which is related to the second function in accordance with the first program control data.

10 Claims, 26 Drawing Sheets

(30) Foreign Application Priority Data

Feb. 27, 2015 (JP) ................................ 2015-038258
Nov. 16, 2015 (JP) ................................ 2015-223788

(56) References Cited

U.S. PATENT DOCUMENTS

| | | | | |
|---|---|---|---|---|
| 7,149,450 B2* | 12/2006 | Takemura | .......... | G03G 15/5075 399/75 |
| 7,812,978 B2* | 10/2010 | Ando | .......... | H04N 1/00278 358/1.13 |
| 8,353,051 B2* | 1/2013 | Ohishi | .......... | G06F 21/608 358/1.14 |
| 8,701,206 B2* | 4/2014 | Yamada | .......... | H04N 1/00411 726/16 |
| 2002/0032772 A1* | 3/2002 | Olstad | .......... | G06F 16/951 709/224 |
| 2002/0097262 A1* | 7/2002 | Iwase | .......... | H04N 1/00127 715/744 |
| 2003/0231343 A1* | 12/2003 | Kobayashi | .......... | G06F 8/60 358/1.16 |
| 2004/0057074 A1* | 3/2004 | Ohishi | .......... | G06F 9/445 358/1.15 |
| 2004/0216058 A1* | 10/2004 | Chavers | .......... | G06F 3/0481 715/810 |
| 2005/0005204 A1* | 1/2005 | Kobayashi | .......... | G06F 11/0733 714/48 |
| 2005/0047812 A1* | 3/2005 | Takemura | .......... | G03G 15/5075 399/75 |
| 2005/0066069 A1* | 3/2005 | Kaji | .......... | G06F 21/34 710/1 |
| 2005/0155027 A1* | 7/2005 | Wei | .......... | G06F 8/44 717/162 |
| 2006/0001909 A1* | 1/2006 | Kawaura | .......... | G06F 9/4406 358/1.16 |
| 2006/0262349 A1 | 11/2006 | Moroi | | |
| 2007/0107042 A1* | 5/2007 | Corona | .......... | H04L 63/0853 726/2 |
| 2007/0143861 A1* | 6/2007 | Ohishi | .......... | G06F 21/608 726/28 |
| 2007/0150738 A1* | 6/2007 | Kawai | .......... | G06F 21/33 713/176 |
| 2007/0285719 A1 | 12/2007 | Kobayashi et al. | | |
| 2008/0002217 A1 | 1/2008 | Kobayashi et al. | | |
| 2008/0117447 A1* | 5/2008 | Okada | .......... | H04N 1/00965 358/1.13 |
| 2008/0154982 A1* | 6/2008 | Watanabe | .......... | G06F 16/51 |
| 2008/0239364 A1* | 10/2008 | Nelson | .......... | G06F 3/1222 358/1.15 |
| 2009/0064002 A1* | 3/2009 | Katsumata | .......... | G03G 15/5016 715/762 |
| 2009/0122358 A1* | 5/2009 | Moore | .......... | H04N 1/0035 358/473 |
| 2009/0180144 A1* | 7/2009 | Ito | .......... | G06K 15/00 358/1.16 |
| 2009/0237699 A1 | 9/2009 | Umezawa | | |
| 2009/0316176 A1* | 12/2009 | Fujimori | .......... | H04N 1/00244 358/1.13 |
| 2009/0316186 A1* | 12/2009 | Higashi | .......... | G06F 21/35 358/1.15 |
| 2010/0188713 A1* | 7/2010 | Ogura | .......... | H04N 1/32128 358/474 |
| 2011/0078683 A1 | 3/2011 | Yamamoto et al. | | |
| 2011/0205593 A1 | 8/2011 | Moroi | | |
| 2012/0023451 A1 | 1/2012 | Kuroyanagi | | |
| 2012/0038955 A1* | 2/2012 | Ooshio | .......... | H04N 1/00384 358/474 |
| 2012/0113468 A1* | 5/2012 | Urakawa | .......... | G06F 9/452 358/1.15 |
| 2012/0260350 A1* | 10/2012 | Yamada | .......... | H04N 1/00411 726/28 |
| 2013/0135676 A1* | 5/2013 | Sakata | .......... | G06F 3/12 358/1.15 |
| 2013/0201509 A1 | 8/2013 | Miyazawa | | |
| 2014/0022600 A1 | 1/2014 | Moroi | | |
| 2014/0300915 A1* | 10/2014 | Ishikura | .......... | G03G 15/5066 358/1.13 |
| 2014/0327934 A1 | 11/2014 | Moroi | | |
| 2014/0359701 A1* | 12/2014 | Kikuchi | .......... | H04L 63/08 726/3 |
| 2015/0156354 A1 | 6/2015 | Yamamoto et al. | | |
| 2015/0347874 A1* | 12/2015 | Mukaiyama | .......... | G06K 15/005 358/1.15 |
| 2016/0021273 A1 | 1/2016 | Moroi | | |
| 2017/0078500 A1 | 3/2017 | Moroi | | |

FOREIGN PATENT DOCUMENTS

| | | |
|---|---|---|
| JP | 2009-303141 A | 12/2009 |
| JP | 2011-151849 A | 8/2011 |
| JP | 2012-027662 A | 2/2012 |
| JP | 2012-113700 A | 6/2012 |
| JP | 2013-161225 A | 8/2013 |
| JP | 2014-021513 A | 2/2014 |
| JP | 2014-063519 A | 4/2014 |

* cited by examiner

FIG. 3
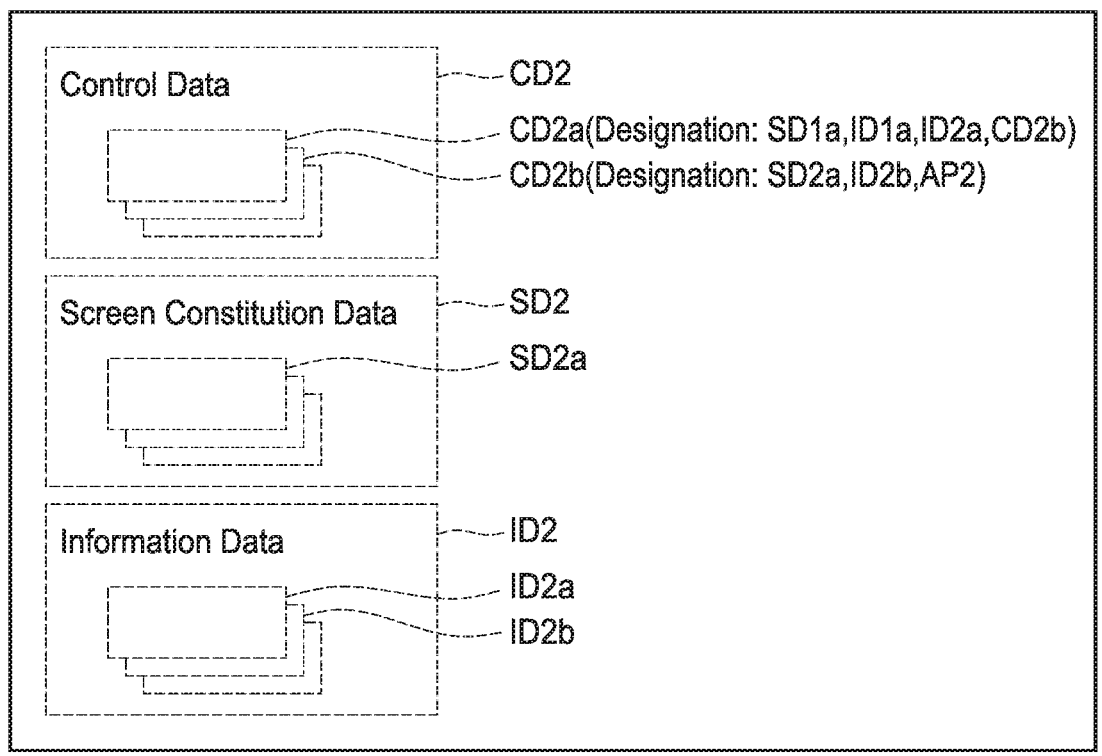
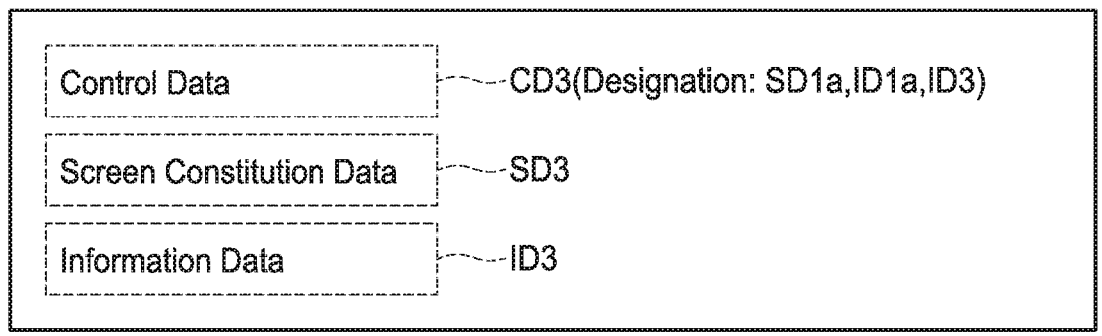

FIG. 13

```
function try_start_custom_app( appid )

local custom_appid = get_custom_app( appid )    }─P11 if custom_appid > 0 then
     start_app( custom_appid )                     }─P12
     return true
  else
     start_app( appid )                            }─P13
     return false
  end end
```
SC1

FIG. 14

```
<?xml version="1.0" encoding="UTF-8" ?>
<screen title="ScanSetting">
 <text>ColorMode</text>
 <list>
  <item>Color</item>
  <item>Mono</item>
 </list>
 <button label="Start" nextcommand="/storage_path/custom_scan_command.xml"/>
</screen>
```
SC2

```
<?xml version="1 0" encoding="UTF-8" ?>              SC3
<event>
  <selected id="ColorMode">Color</selected>
</event>
```

FIG. 16

```
<?xml version="1 0" encoding="UTF-8" ?>              SC4
<scan>
  <resolution>high</resolution>

<send_host>
    <script><![CDATA[ file_server_hostname ]]></script>
  </send_host>

<script><![CDATA[
    if user_setting["ColorMode"] == "Color"
      replace_field = "<color_mode>color</color_mode>"     P41
    else
      replace_field = "<color_mode>mono</color_mode>"
    end
  ]]></script>

</scan>
```

FIG. 17

```
<?xml version="1 0" encoding="UTF-8" ?>
<scan>
 <resolution>high</resolution>
 <send_host> PC1 </send_host>
 <color_mode>color</color_mode>
</scan>
```
SC5

FIG. 20

```
<?xml version="1 0" encoding="UTF-8" ?>
<scan>
  <resolution>high</resolution>
  <send_address> user1@com </send_address>
  <color_mode>color</color_mode>
</scan>
```
SC6

FIG. 22A

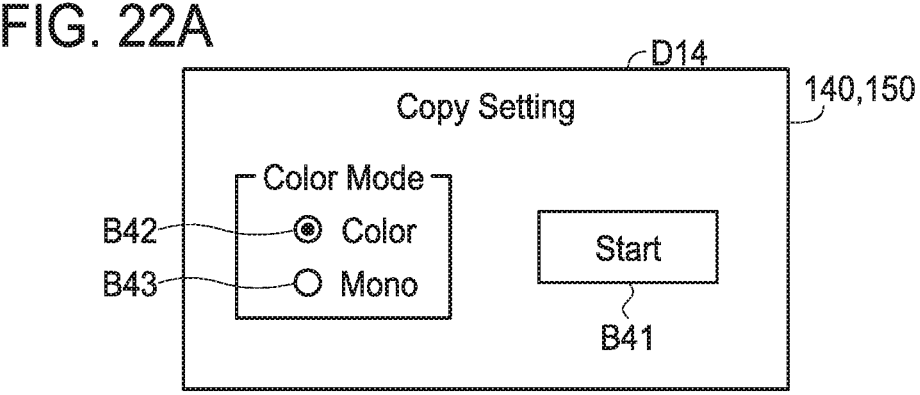

FIG. 22B

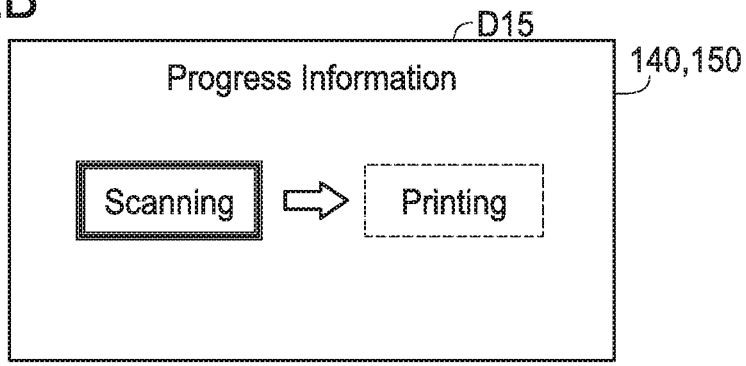

FIG. 23

```
<?xml version="1 0" encoding="UTF-8" ?>
<screen title="ScanSetting">
  <text>ColorMode</text>
  <list>
    <script><![CDATA[
      if current_login_user_profile["login_name"]=="NAME1"
        replace_field = "<item>Color</item> <item>Mono</item>"
      else
        replace_field = "<item>Mono</item>"
      end
    ]]></script>
  </list>
  <button label="Start" nextcommand="/storage_path/custom_scan_command.xml"/>
</screen>
```

FIG. 24

```
<?xml version="1 0" encoding="UTF-8" ?>
<scan>
  <resolution>high</resolution>

<send_address>
    <script><![CDATA[ current_login_user_profile["email_address"] ]]></script>
  </send_address>

<script><![CDATA[
    if user_setting["ColorMode"] == "Color"
      replace_field = "<color_mode>color</color_mode>"
    else
      replace_field = "<color_mode>mono</color_mode>"
    end
  ]]></script>
</scan>
```

FIG. 25

SH
- custom script
- ver 1.1
- author (company name)

```
function func1( )
  ...
end function func2( )
  ...
end
```
⁝

FIG. 26
| Basic Function | Color Option | | |
|---|---|---|---|
| | Color/Monochrome | Color | Monochrome |
| Copy | 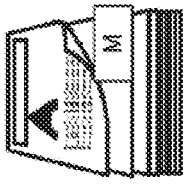 | 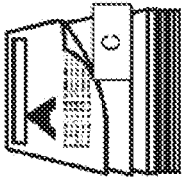 | 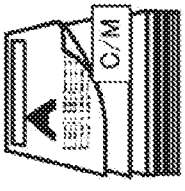 |
| Scan | 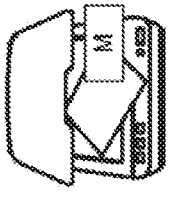 | 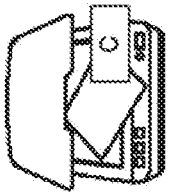 | 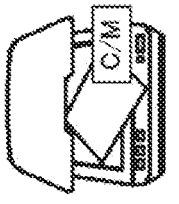 |
| FAX Sending | 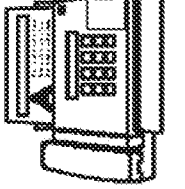 | 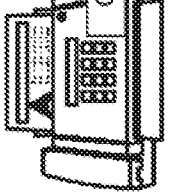 | 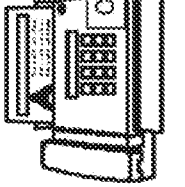 |
| Print | 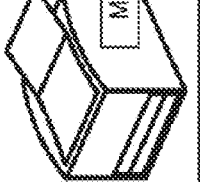 | 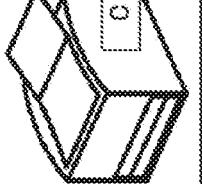 | 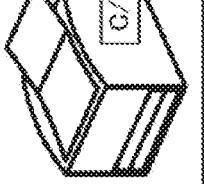 |

FIG. 27
| Save Destination Option | Icon Data |
|---|---|
| USB | 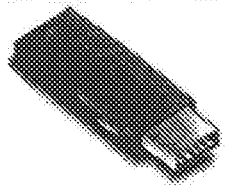 |
| Cloud | 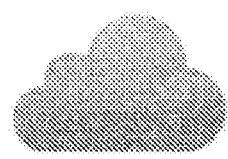 |
| FTP | 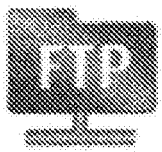 |
| E-mail | 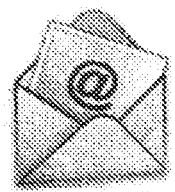 |
| PC | 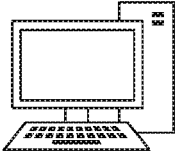 |

IMAGE PROCESSING DEVICE

CROSS-REFERENCE TO RELATED APPLICATIONS

This application claims priority to Japanese Patent Application No. 2015-013503, filed on Jan. 27, 2015, Japanese Patent Application No. 2015-012994, filed on Jan. 27, 2015, Japanese Patent Application No. 2015-038258, filed on Feb. 27, 2015, and Japanese Patent Application No. 2015-223788, filed on Nov. 16, 2015, the contents of which are hereby incorporated by reference into the present application.

TECHNICAL FIELD

The technique disclosed in the present specification relates to an image processing device capable of performing a plurality of functions related to image processing.

DESCRIPTION OF RELATED ART

An image processing device capable of performing a plurality of functions related to image processing is widespread. For example, a scanner device is known that is capable of performing a plurality of functions related to a scan process (e.g., a function for storing scan data in an internal memory, a function for sending scan data to an external device, etc.). In order to add a program for performing a new function to such an image processing device, a technique is proposed for reading and activating the program from a recording medium inserted into a slot.

SUMMARY

The fact is that insufficient ingenuity has been made to increase flexibility of customization related to a function performed by an image processing device. The present specification provides a technique capable of increasing flexibility of customization related to a function in an image processing device.

An image processing device may comprise: a display; a processor; and a first storage device configured to store a plurality of application programs for providing a plurality of functions related to an image processing, and store computer-readable instructions, wherein the computer-readable instructions, when executed by the processor, cause the image processing device to perform: activating a first application program for providing a first function corresponding to a first item image among the plurality of application programs, in a case where the first item image is selected by a user from among N1 pieces of item images included in a first item selection screen displayed on the display, under a non-connection state in which a storage device that stores program control data is not connected to the processor, the N1 being an integer equal to 1 or more; activating a second application program for providing a second function being different from the first function among the plurality of application programs, in a case where a second item image is selected by the user from among N2 pieces of item images included in a second item selection screen displayed on the display, under a connection state in which a second storage device that stores first program control data is connected to the processor, the second item image being an image that the first program control data is to be used, the second function being designated by the first program control data, and the N2 being an integer equal to 1 or more; and causing the display to display a function related screen which is related to the second function in accordance with the first program control data in the case where the second item image is selected under the connection state, wherein in a case where the first program control data designates first screen constitution data and first information data, the function related screen has a first style according to the first screen constitution data and includes a particular information image according to the first information data.

A control method and computer-readable instructions for implementation of the image processing device, and a non-transitory computer-readable recording medium in which the computer-readable instructions are stored, are also novel and useful.

BRIEF DESCRIPTION OF THE DRAWINGS

FIG. 3 shows data in a second non-volatile storage device and a memory card;
FIG. 13 to FIG. 17 show first to fifth scripts;
FIG. 20 shows a sixth script;
FIG. 22A and FIG. 22B show screens related to a copy function;
FIG. 23 to FIG. 25 show scripts of modifications;
FIG. 26 shows icon data corresponding to basic functions;
FIG. 27 shows icon data corresponding to destination options.

EMBODIMENT

Figure 1:
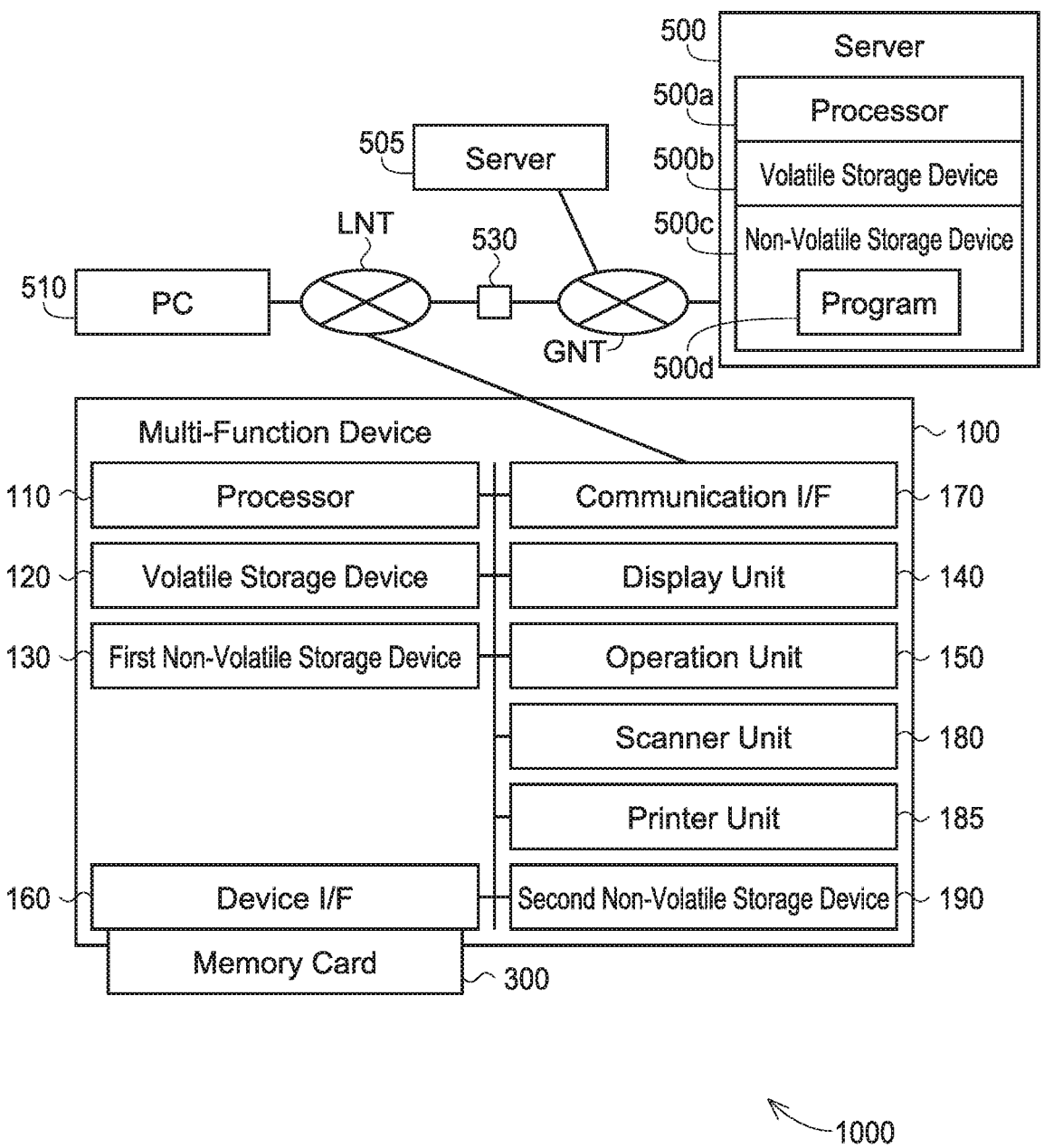
FIG. 1 shows a configuration of an image processing system.

First Embodiment (As to System)
As shown in FIG. 1, an image processing system 1000 is constituted by an internal network LNT and an external network GNT. A multi-function device 100 and a PC 510 are connected to the internal network LNT. Servers 500, 505 are connected to the external network GNT. Further, a relay device 530 (router in the present embodiment) for connecting the internal network LNT and the external network GNT is provided in the system 1000.

The external network GNT is e.g., a public network such as the Internet. An unspecified plurality of devices can be connected to the external network GNT.

The internal network LNT is a non-public network closed within a local area such as, e.g., a family, company, etc. Devices capable of being connected with the internal network LNT are limited by an administrator of the internal network LNT. The multi-function device 100 belongs to the internal network LNT, and does not belong to the external network GNT.

The internal network LNT and the external network GNT are separated by the relay device 530. The multi-function device 100 is capable of communicating with the PC 510 via the internal network LNT. Further, the multi-function device 100 is capable of communicating with the servers 500, 505 connected with the external network GNT via the internal network LNT and the relay device 530.

The server 500 is a computer comprising a processor 500*a*, a volatile storage device 500*b*, and a non-volatile storage device 500*c*. The processor 500*a* is a device, such as a CPU, which performs data processing. The volatile storage device 500*b* is, e.g., a DRAM, and the non-volatile storage device 500*c* is, e.g., a hard disk drive. A program 500*d* is stored in the non-volatile storage device 500*c*. The processor 500*a* implements various functions, to be described, by performing the program 500*d*. Further, the PC 510 and the server 505 are each a computer comprising a processor (e.g., CPU) and a storage device.

The multi-function device 100 is a device capable of performing multiple functions such as print function, scan function, copy function, FAX function, etc. The multi-function device 100 comprises a processor 110, a volatile storage device 120, a first non-volatile storage device 130, a display unit 140, an operation unit 150, a device I/F 160, a communication I/F 170, a scanner unit 180, a printer unit 185, and a second non-volatile storage device 190. These elements are connected to one another by a bus. Moreover, below, "volatile" and "non-volatile" may be omitted, and may be referred to simply as "storage device".

The processor 110 is a device which performs data processing, e.g., a CPU. The volatile storage device 120 is, e.g., a DRAM, and each storage device 130, 190 is, e.g., a flash memory. The display unit 140 is a device for displaying an image and is, e.g., a liquid crystal display. The operation unit 150 is a device for accepting a user operation and may, for example, be configured by a plurality of keys, or may be a so-called touch panel.

The device I/F 160 is an I/F for mounting a removable storage device (e.g., USB flash drive, SD card, etc.), such as e.g., an USB I/F, SD standard slot, etc. In the example of FIG. 1, a memory card 300 is attached to the device I/F 160. The memory card 300 is a rewritable storage device. For example, the user can connect the memory card 300 to a computer, and store various data in the memory card 300 by operating the computer. However, in a modification, the memory card 300 may be a storage device in which the rewriting of data is prohibited.

The communication I/F 170 is an I/F for communicating with another device (e.g., a wired LAN I/F, an IEEE802.11 wireless I/F). The internal network LNT is connected with the communication I/F 170.

The scanner unit 180 creates scan data by optically reading an object such as a document by using a photoelectric conversion element such as a CCD or a CMOS. The scan data is, e.g., RGB format bit map data representing a color scan image.

The printer unit 185 is a device for printing an image on a print medium. In the present embodiment, the printer unit 185 is an ink jet type print device using ink of each of cyan, magenta, yellow and black. However, in a modification, the printer unit 185 may be a print device of another scheme (e.g., a laser scheme).

The multi-function device 100 drives the scanner unit 180 in accordance with an instruction from the user, and creates scan data representing an object by optically reading the object. Then, the multi-function device 100 can send the scan data to another device (e.g., the server 505 or the PC 510). Further, the multi-function device 100 can cause the printer unit 185 to print an image represented by the scan data.

Figure 2:
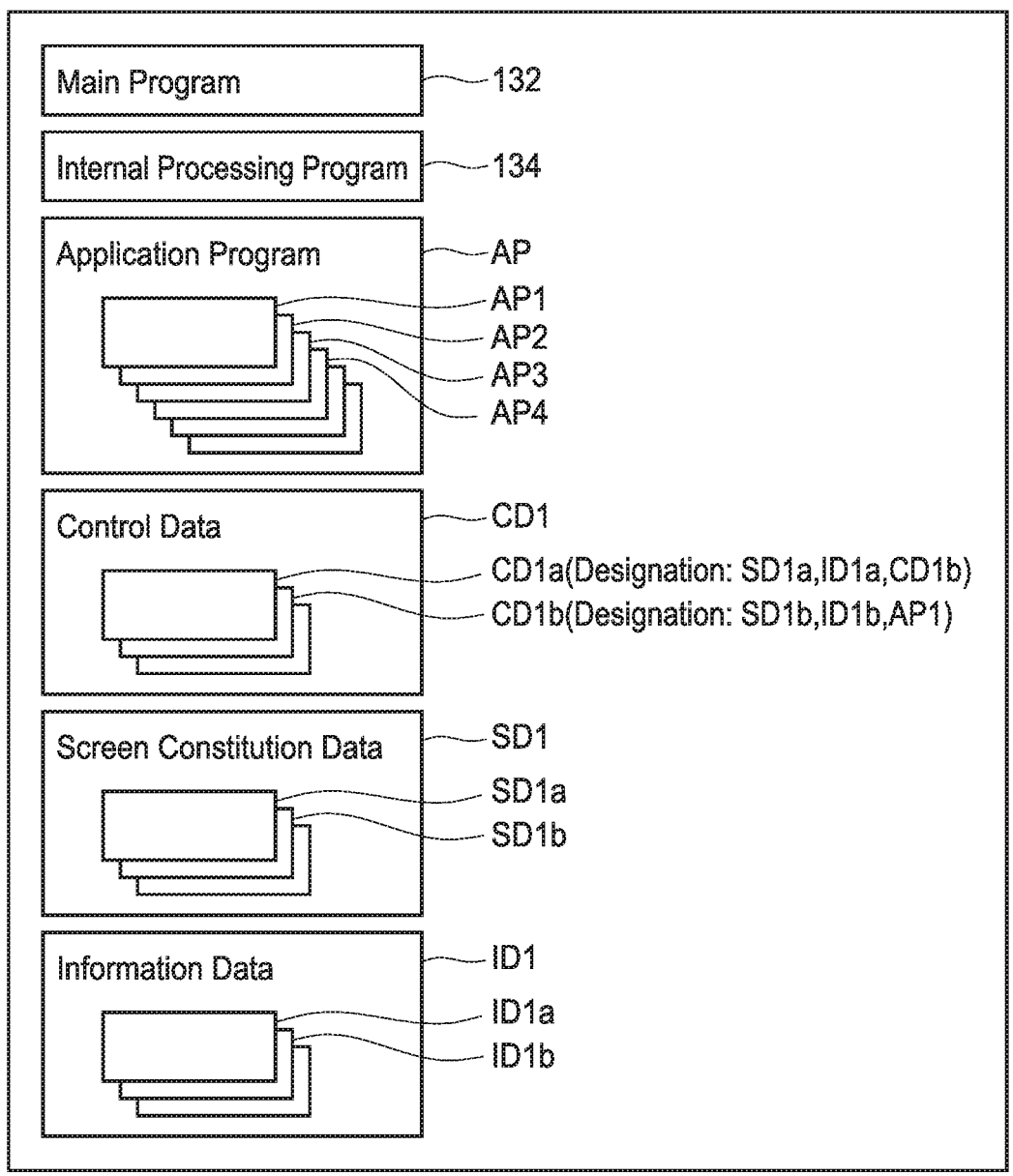
FIG. 2 shows data in a first non-volatile storage device.

(Data Configuration; FIG. 2, FIG. 3)

As shown in FIG. 2, the storage device 130 stores a main program 132, an internal processing program 134, an application program (simply called "application" below) AP, control data CD1, screen constitution data SD1, and information data ID1. This data is stored in advance as firmware in the storage device 130 by the vendor of the multi-function device 100. The processor 110 implements various functions by performing the programs 132, etc.

The application AP includes a plurality of applications AP1 to AP4, etc. corresponding to a plurality of functions such as print function, scan function, copy function, etc.

The control data CD1 is data in XML (abbreviation of Extensible Markup Language) format, which is a markup language and, more specifically, is described in Lua, which is a script language for branching a process in response to the user performing a selection operation on the operation unit 150. In particular, in XML format, a region specified by a predetermined editing tag is described in the Lua programming language. One element is represented by a start tag in which the element name is described, an end tag in which the element name is described, and description contents between these tags. For example, <host>AAA</host> represents that the contents of the element "host" is "AAA". Control data CD2, CD3, to be described (see FIG. 3) is also the same as the control data CD1.

The control data CD1 is configured by a plurality of pieces of control data CD1*a*, CD1*b*, etc. The control data CD1*a*, etc. may designate a screen constitution data identifier, an information data identifier, a control data identifier, and an application identifier. The identifier may be, e.g., a file name of a data file, or a unique character string in a data file. For example, the control data CD designates screen constitution data SD1*a*, information data ID1*a*, control data CD1*b,* and does not designate an application. Further, the control data CD2*b* designates the screen constitution data SD1*a*, information data ID1*b*, an application AP1, and does not designate control data.

The screen constitution data SD1 is CSS (abbreviation of Cascading Style Sheets) format data, and is configured by a plurality of pieces of screen constitution data SD1*a*, SD1*b*, etc. The screen constitution data SD1*a*, etc. represents the style of a screen to be displayed (e.g., display position and size, etc. of an information image such as an icon). Screen constitution data SD2, SD3, to be described (see FIG. 3), is also the same as the screen constitution data SD1.

The information data ID1 is data representing an information image, character string, etc., and is configured by a plurality of pieces of the information data ID1*a*, ID1*b*, etc.

The information data representing the information image is data in, e.g., JPEG format, PNG format, etc. The information data representing the character string is text data in, e.g., ASCII format. Information data ID2, ID3 (see FIG. 3), to be described, is also the same as the information data ID1.

For example, in the case where the user performs an operation via the display unit 140 and the operation unit 150, the processor 110 refers to the control data corresponding to that operation, and performs the following process. For example, in the case of referring to the control data CD1a, the processor 110 causes the display unit 140 to display a screen in accordance with the screen constitution data SD1a and the information data ID1a. Further, e.g., in the case of referring to the control data CD1b, the processor 110 causes the display unit 140 to display the next screen in accordance with the screen constitution data SD1b and the information data ID1b and starts the application AP1 to perform a function.

Figure 10A:
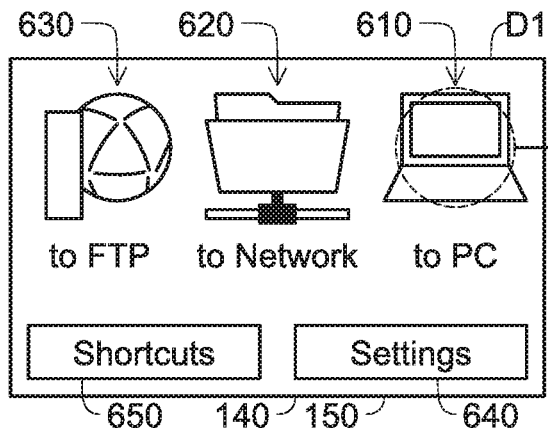
FIG. 10A to FIG. 10F show screens related to a scan function.

FIG. 10A to FIG. 10F show examples of the screens displayed on the display unit 140. A screen D1 of FIG. 10A is a screen displayed in accordance with the control data CD1a. In the screen D1, a plurality of images represented by the information data ID1a is located at a plurality of positions corresponding to the style indicated by the screen constitution data SD1a. The screen constitution data SD1a designates the attributes of each of five items including three options 610, 620, 630 and two buttons 640, 650. The attributes include, e.g., background color of the item, position on the screen of the item, size of the item (i.e., height and width), font of character string, font size of character string, font color of character string, etc. Further, the information data ID1a represents an icon image and character string of each of the five items 610 to 650. Further, in the example of FIG. 2, the control data CD1a is shown designating only the one piece of control data CD1b. However, actually, the control data CD1a designates five pieces of control data corresponding to the five items 610 to 650. Then, in the case where any item is selected from among the five items 610 to 650, the next screen is displayed in accordance with the control data corresponding to the selected item. For example, in the case where item 610 is selected, the next screen is displayed in accordance with the control data CD1b.

Figure 10B:
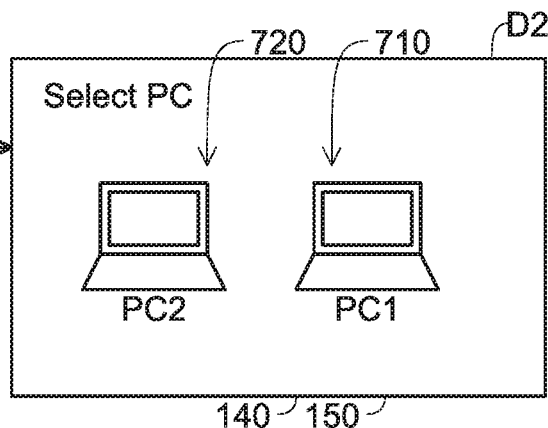

A screen D2 of FIG. 10B shows a screen displayed in accordance with the control data CD1b. In the screen D2, a plurality of images represented by the information data ID1b is located at a plurality of positions corresponding to the style indicated by the screen constitution data SD1b. The screen constitution data SD1b defines a screen representing a list of PCs to be searched in the process implemented by the application AP1. The information data ID1b represents items 710, 720 indicating an icon image of each computer. A character string arranged below the icon image is a computer name notified from the computer.

The data in the storage device 130 is capable of realizing e.g., a "SCAN to FTP" function in which scan data is sent to a FTP server, a "SCAN to Network" function in which the scan data is stored in a designated folder on the network, and a "SCAN to PC" function in which the scan data is stored in a previously registered PC.

The storage device 190 of FIG. 1 is a rewritable storage device. An administrator or the like of the multi-function device 100 is able to store any data in the storage device 190. The main program 132 causes the processor 110 to implement the function of storing various data in the storage device 190 in accordance with an instruction input via the operation unit 150.

In the example of FIG. 3, the storage device 190 stores various data including the control data CD2, the screen constitution data SD2, and the information data ID2. The data CD2, SD2, ID2 includes data used for performing a change in the function realized by the data groups stored in the storage device 130. For example, a data example will be described for changing the "SCAN to PC" function, which is provided as a standard function of the multi-function device 100, to another function. That is, control data CD2a is stored in the storage device 190 in order to display a screen D3 of FIG. 10C instead of the screen D1. The control data CD2a designates the screen constitution data SD1a, the information data ID1a, information data ID2a, and the control data CD2b. In the case where the item 610 is selected from among the five items 610 to 650 in the screen D3, the control data CD2b is referred to. The control data CD2b designates screen constitution data SD2a, information data ID2b, and an application AP2. Moreover, below, the storage device 190 may be referred to as "internal storage area 190".

In the example of FIG. 3, the memory card 300 stores various data including the control data CD3, the screen constitution data SD3, and the information data ID3. For example, a screen D5 of FIG. 10E is displayed instead of the screen D1 in accordance with the control data CD3. The control data CD3 designates the screen constitution data SD1a, the information data ID1a, and the information data ID3. Moreover, below, the memory card 300 may be referred to as "external storage area 300".

Figure 4:
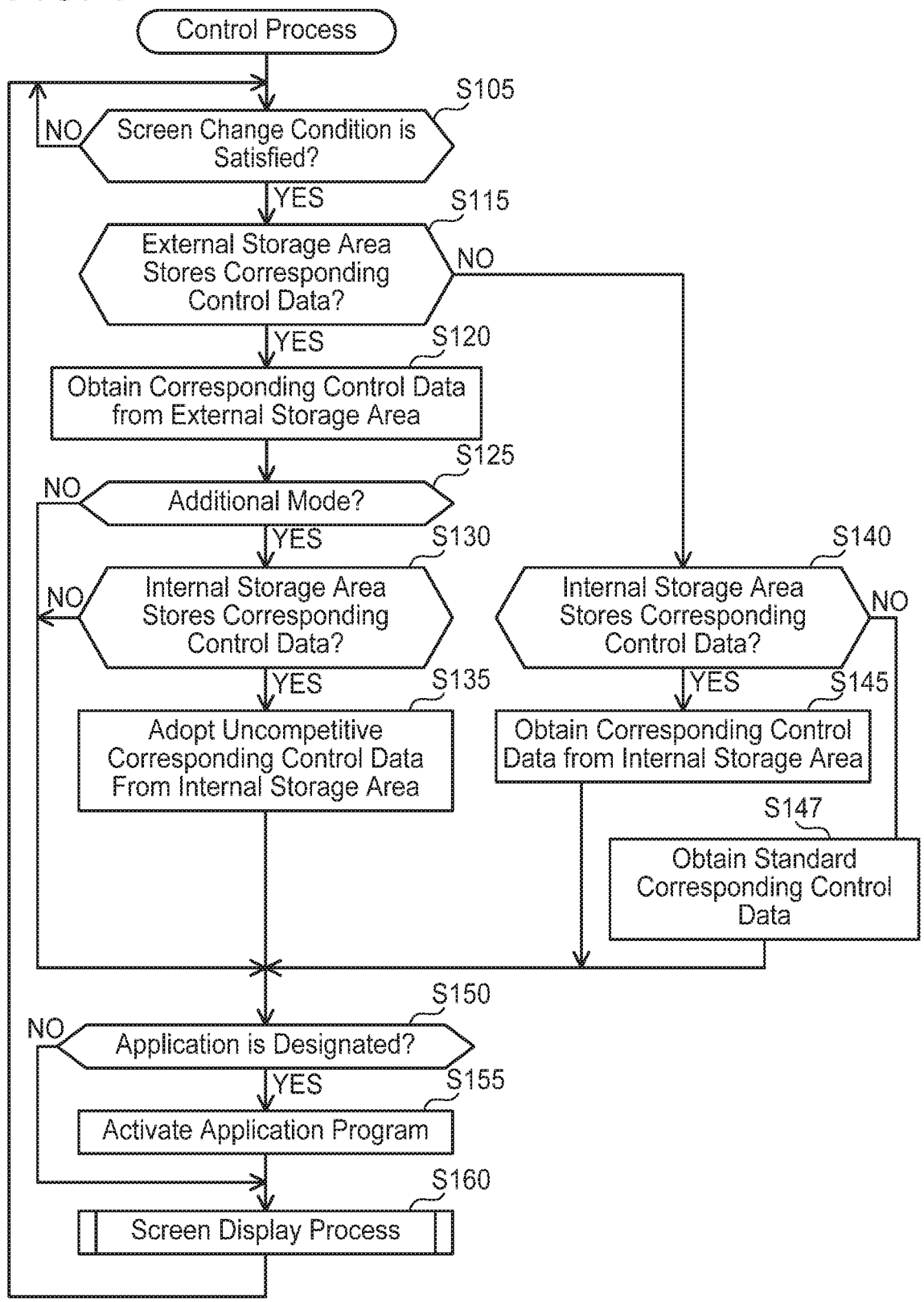
FIG. 4 shows a flowchart of a control process.

(Control Process; FIG. 4)

FIG. 4 is a flowchart of a control process for controlling the multi-function device 100. When the power of the multi-function device 100 is turned on, a menu screen of FIG. 9 including a plurality of icon images 81 to 84 is displayed as an initial screen. Then, the processor 110 performs the control process of FIG. 4 in accordance with the main program 132.

In S105, the processor 110 judges whether a screen change condition is satisfied. The screen change condition is a condition for changing the screen displayed on the display unit 140. The user can select a desired item by touching a position on the screen overlapping with the desired item. For example, in the case where the icon image 82 indicating scanning is selected in the menu screen of FIG. 9, the processor 110 judges that the screen change condition is satisfied (YES in S105), and proceeds to S115. Below, the event of judging that the screen change condition is satisfied is referred to as "trigger".

In the processes from S115 onward, the processor 110 performs a process which includes changing the screen displayed on the display unit 140 in accordance with control data corresponding to the trigger (called "corresponding control data"). In S115, the processor 110 judges whether the external storage area 300 is storing the corresponding control data. In the case where the corresponding control data is being stored in the memory card 300 connected with the device I/F 160, the judging result of S115 is "YES". In the case where the memory card 300 is not connected with the device I/F 160, or in the case where the memory card 300 is connected with the device I/F 160 but the corresponding control data is not being stored in the memory card 300, the judging result of S115 is "NO".

In the case of "NO" in S115, in S140 the processor 110 judges whether the internal storage area 190 is storing the corresponding control data. In S140, this is equivalent to the processor 110 judging whether the internal storage area 190 storing the corresponding control data is connected to the processor 110.

Figure 9:
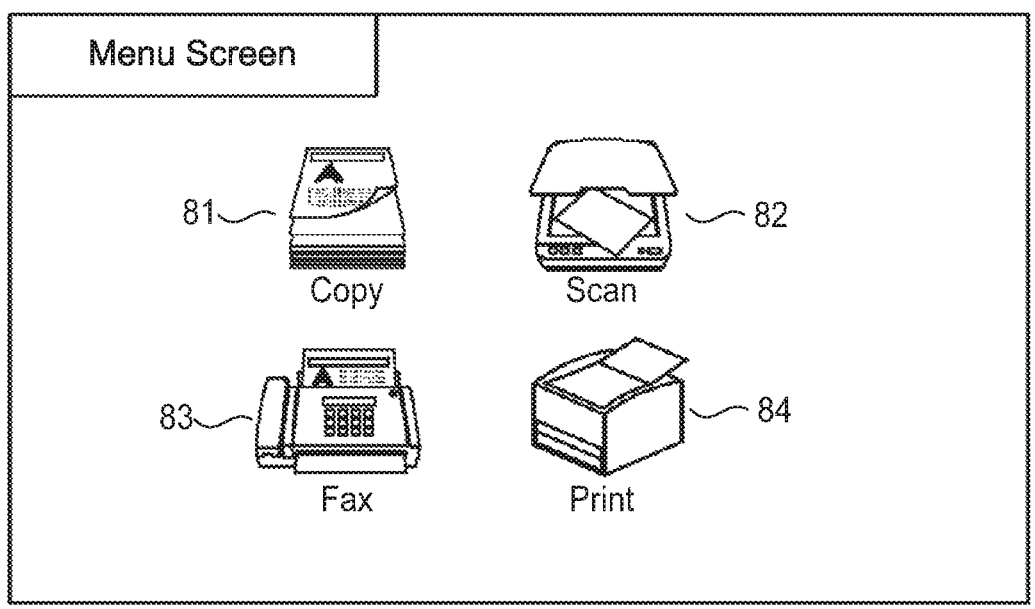
FIG. 9 shows a menu screen.

In the case of "NO" in S140, in S147 the processor 110 obtains standard corresponding control data from the storage device 130. For example, in the case where the icon image 82 of FIG. 9 is selected, the control data CD1a of FIG. 2 is obtained. When S147 ends, the process proceeds to S150.

In the case of "YES" in S140, in S145 the processor 110 obtains the corresponding control data from the internal storage area 190. For example, in the case where the icon image 82 of FIG. 9 is selected, the control data CD2a of FIG. 3 is obtained. When S145 ends, the process proceeds to S150.

In the case of "YES" in S115, in S120 the processor 110 obtains the corresponding control data from the external storage area 300. For example, in the case where the icon image 82 of FIG. 9 is selected, the control data CD3 of FIG. 3 is obtained. When S120 ends, the process proceeds to S125.

In S125, the processor 110 judges whether the process mode of the control process is "additional mode". The user can select the process mode from among a plurality of modes including "additional mode" and "priority mode" by selecting the settings button 640 of FIG. 10A, etc. "Additional mode" is a mode for also utilizing data in the internal storage area 190 in addition to the data in the external storage area 300. "Priority mode" is a mode for searching for data, in the sequence of the external storage area 300 and then the internal storage area 190, and utilizing the data that is found first. The processes in the case of "YES" in S125 (i.e., S130, S135) will be described later. In the case of "NO" in S125, the process proceeds to S150.

In S150, the processor 110 judges whether the corresponding control data is designating an application. In the case where an application is designated (i.e., YES in S150), in S155 the processor 110 performs an activation process for activating the application, and proceeds to S160. In the case an application is not being designated (i.e., NO in S150), the processor 110 skips S155, and proceeds to S160.

In S160, the processor 110 performs a screen display process for causing the display unit 140 to display a new screen in accordance with the corresponding control data. In response to the display of the screen ending, the processor 110 ends S160, and returns to S105.

Figure 5:
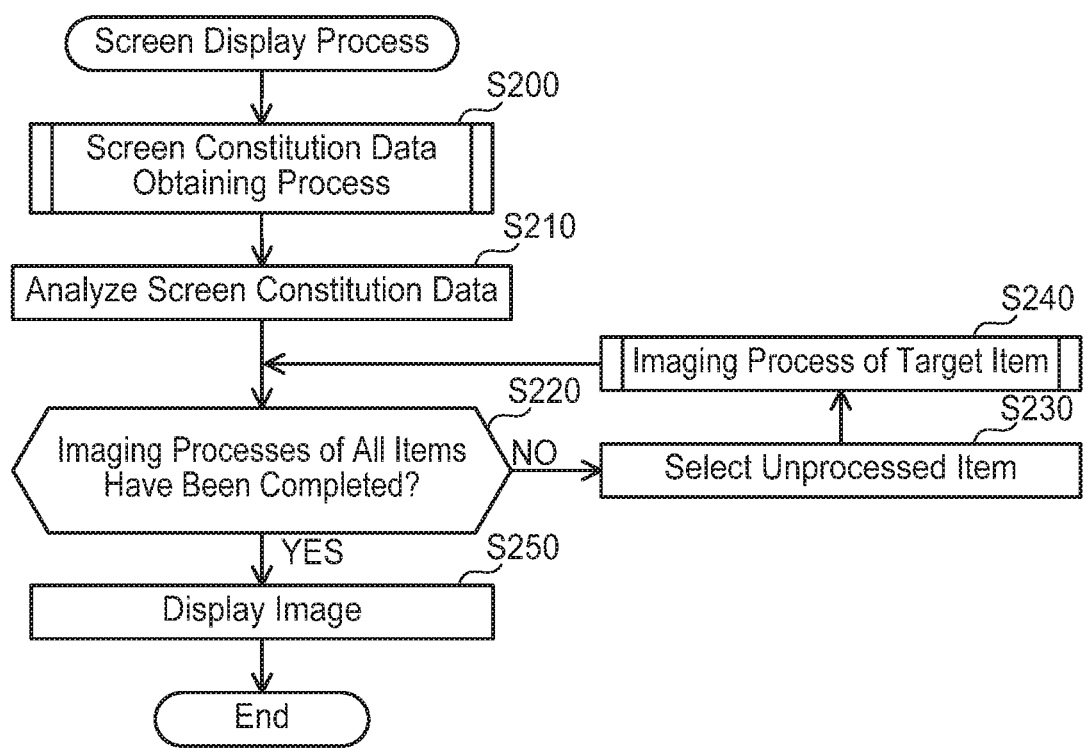
FIG. 5 shows a flowchart of a screen display process.

(Screen Display Process; FIG. 5)

FIG. 5 shows a flowchart of the screen display process (see S160 of FIG. 4). In S200, the processor 110 performs a screen constitution data obtaining process for obtaining screen constitution data designated by the corresponding control data. Below, the screen constitution data designated by the corresponding control data is called "corresponding screen constitution data".

Figure 6:
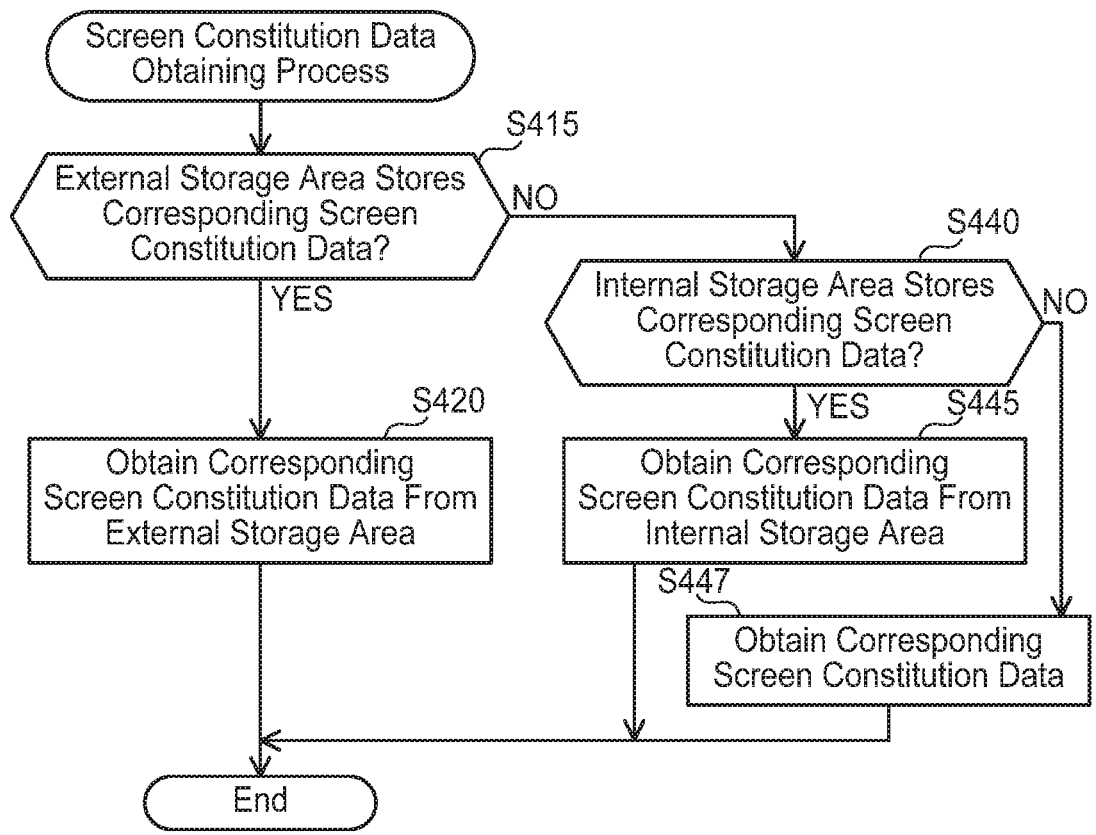
FIG. 6 shows a flowchart of a screen constitution data obtaining process.

FIG. 6 shows a flowchart of the screen constitution data obtaining process (see S200 of FIG. 5). In S415, the processor 110 judges whether the external storage area 300 is storing the corresponding screen constitution data. In the case where the corresponding screen constitution data is being stored in the memory card 300 connected with the device I/F 160, the judging result of S415 is "YES". In the case where the memory card 300 is not connected with the device I/F 160, or in the case where the memory card 300 is connected with the device I/F 160 but the corresponding screen constitution data is not being stored in the memory card 300, the judging result of S415 is "NO".

In the case of "NO" in S415, in S440 the processor 110 judges whether the internal storage area 190 is storing the corresponding screen constitution data. In S440, this is equivalent to the processor 110 judging whether the internal storage area 190 storing the corresponding screen constitution data is connected to the processor 110.

In the case of "NO" in S440, in S447 the processor 110 obtains standard corresponding screen constitution data from the storage device 130. In the case of "YES" in S440, in S445 the processor 110 obtains the corresponding screen constitution data from the internal storage area 190. Further, in the case of "YES" in S415, in S420 the processor 110 obtains the corresponding screen constitution data from the external storage area 300. When S420, S445, or S447 end, the process of FIG. 6 ends, and the process proceeds to S210 of FIG. 5.

In S210, the processor 110 analyzes the corresponding screen constitution data obtained in S200, and specifies the style (e.g., display position and size, etc. of the icon image) of the screen to be displayed.

In S220, the processor 110 judges whether imaging processes of all the items designated by the corresponding control data have been completed. In the case where an unprocessed item remains (NO in S220), in S230 the processor 110 selects one item from among the unprocessed items as a process target item (called "target item" below) and, in S240, performs an imaging process of the target item. The imaging process of the target item is a process for creating an image representing the target item in accordance with the corresponding control data, the corresponding screen constitution data, and the information data corresponding to the target item. The correspondence relationship of the item and the information data is designated by the corresponding control data. Below, the information data corresponding to the target item is called "corresponding information data".

Figure 7:
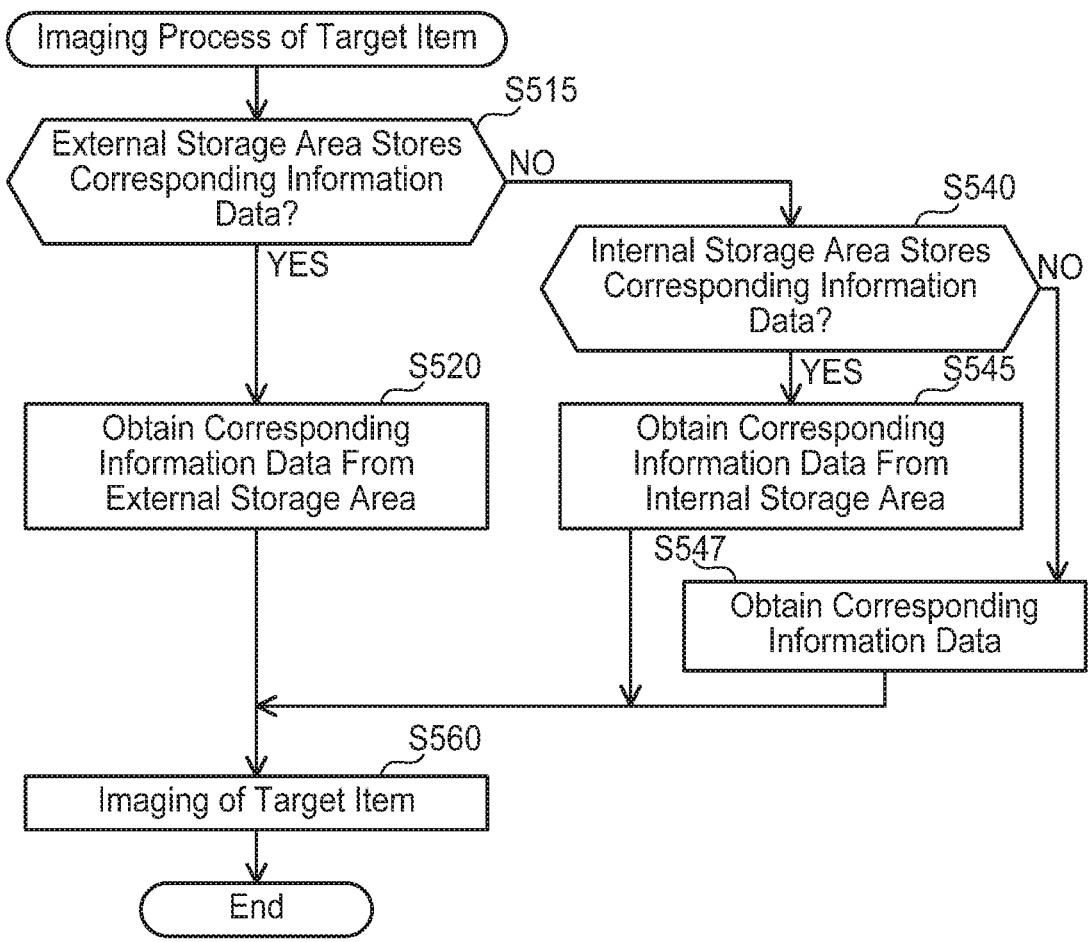
FIG. 7 shows a flowchart of an imaging process.

FIG. 7 shows a flowchart of the imaging process of the target item (see S240 of FIG. 5). In S515, the processor 110 judges whether the external storage area 300 is storing the corresponding information data. In the case where the corresponding information data is being stored in the memory card 300 connected with the device I/F 160, the judging result of S515 is "YES". In the case where the memory card 300 is not connected with the device I/F 160, or in the case where the memory card 300 is connected with the device I/F 160 but the corresponding information data is not being stored in the memory card 300, the judging result of S515 is "NO".

In the case of "YES" in S515, in S520, the processor 110 obtains the corresponding information data from the external storage area 300, and proceeds to S560. On the other hand, in the case of "NO" in S515, in S540 the processor 110 judges whether the internal storage area 190 is storing the corresponding information data. In S540, this is equivalent to the processor 110 judging whether the internal storage area 190 storing the corresponding information data is connected to the processor 110.

Here, it is assumed e.g., that information data representing the item 610, among the five items 610 to 650 (FIG. 10C) designated by the control data CD2a (see FIG. 3), is the information data ID2a stored in the internal storage area 190, and that each information data representing the other items 620 to 650 is the information data ID1a stored in the storage device 130. In the case where the item 610 is the target item, the information data ID2a corresponding to the item 610 is being stored in the internal storage area 190, and consequently the judging result of S540 is "YES". In this case, in S545 the processor 110 obtains the corresponding information data ID2a from the internal storage area 190, and proceeds to S560. On the other hand, in the case where any of the other items 620 to 650 is the target item, the judging result of S540 is "NO". In this case, in S547 the processor 110 obtains the standard corresponding information data ID1*a* from the storage device 130, and proceeds to S560.

In S560, the processor 110 creates image data representing the target item by using the corresponding screen constitution data and the corresponding information data. In the case where the corresponding information data includes icon image data, the processor 110 creates image data representing the target item by adjusting the icon image data so as to match the attributes designated by the corresponding screen constitution data. Further, in the case where the corresponding information data includes ASCII format text data, the processor 110 creates image data indicating a character string represented by the text data so as to match the attributes designated by the corresponding screen constitution data.

When the imaging process of the target item in S560 ends, the process of FIG. 7 ends, and the process proceeds to S220 of FIG. 5. The processor 110 repeats S220 to S240 until the imaging process of all the items has been completed. Then, in the case where the imaging process of all the items has been completed (YES in S220), in S250 the processor 110 causes the display unit 140 to display a new screen using the image data created in S240.

(Case of Using Control Data in First Non-Volatile Storage Device 130)

A case is described in which the corresponding control data is not being stored in the internal storage area 190 and the external storage area 300. For example, in a case of judging that the screen change condition is satisfied due to the icon image 82 of FIG. 9 being selected (YES in S105 of FIG. 4), the processor 110 judges "NO" in S115 and S140 and, in S147, obtains the corresponding control data CD (see FIG. 2), which is the standard control data. Since an application is not designated in the control data CD1*a*, the processor 110 judges "NO" in S150, skips S155, and in S160 causes the display unit 140 to display the screen D1 of FIG. 10A. Below, the process for the case where the item 610 of FIG. 10A is selected is described. The item 610 is an item for performing a process of sending scan data to a PC via the internal network LNT connected with the communication I/F 170.

In response to the item 610 being selected by the user, the screen change condition is satisfied (YES in S105 of FIG. 4). The control data CD1*a* designates the control data CD1*b* as the control data corresponding to the item 610 (see FIG. 2). The control data CD1*b* is stored in the storage device 130, and is not stored in the internal storage area 190 and the external storage area 300. In this case, the judging result of S115 is "NO", and the judging result of S140 is "NO". In S147, the processor 110 obtains the corresponding control data CD1*b* from the storage device 130. The control data CD1*b* designates the application AP1. Consequently, the judging result of S150 is "YES", and in S155 the processor 110 activates the application AP1.

The processor 110 searches for a PC on the internal network LNT connected with the communication I/F 170 in accordance with the application AP1. The search target PC is a computer capable of receiving scan data (e.g., a computer including a publicly shared folder for file sharing). Here, the case will be described of finding two PCs including the PC 510 of FIG. 1.

In S160, the processor 110 causes the display unit 140 to display the screen D2 of FIG. 10B in accordance with the control data CD1*b*. The user can select a scan data destination by selecting a desired computer on the screen D2. As a result, in accordance with the application AP1, the processor 110 causes the scanner unit 180 to perform scanning, and sends the scan data to the selected destination (e.g., the PC 510). That is, the processor 110 can perform the "SCAN to PC" function.

Although not shown, the control data CD1*a* also designates the standard control data corresponding to the other items 620 to 650 of FIG. 10A. The standard control data designates corresponding applications. As a result, in the case where any of the items 620 to 650 is selected, the processor 110 activates an application corresponding to the selected item (S155 of FIG. 4), and performs a process (i.e., function) corresponding to the selected item.

(Case of Using Control Data in Internal Storage Area 190)

Next, a case will be described in which the corresponding control data is being stored in the internal storage area 190. That is, a case is described in which the administrator or the like of the multi-function device 100 is storing in advance control data for customization, or the like, in the internal storage area 190. Below, a case is described in which the control data CD2*a* (see FIG. 3) in the internal storage area 190 is control data corresponding to the icon image 82 of FIG. 9. The control data CD2*a*, like the control data CD1*a* (see FIG. 2), defines the five items 610 to 650. Further, the control data CD2*a* designates the screen constitution data SD1*a*, the information data ID1*a*, ID2*a*, and the control data CD2*b*. Moreover, the screen constitution data SD1*a* and the information data ID1*a* designated by the control data CD2*a* are stored in the storage device 130.

In response to the icon image 82 of FIG. 9 being selected, the screen change condition is satisfied (YES in S105 of FIG. 4), and in S115 it is judged that the corresponding control data is not being stored in the memory card 300 (NO in S115). Then, the processor 110 judges that the internal storage area 190 is storing the corresponding control data CD2*a* (YES in S140) and, in S145 obtains the control data CD2*a* from the internal storage area 190. Since the control data CD2*a* does not designate an application, the judging result of S150 is "NO". In S160, the processor 110 causes the display unit 140 to display the screen D3 of FIG. 10C in accordance with the control data CD2*a*.

Figure 10C:
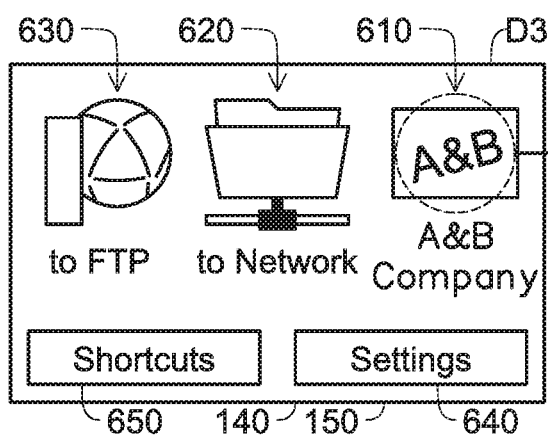

In FIG. 10A and FIG. 10C, the icon image and character string of the item 610 are different. This type of change of the icon image and character string is realized by the control data CD2*a*. Moreover, an example is shown in which the item 610 in the screen D3 is designating the FTP server in the "SCAN to FTP" function. More specifically, the item 610 is an item for performing a process of sending scan data to the particular server 505, which is the FTP server, via the internal network LNT connected with the communication I/F 170 and the external network GNT.

The control data CD2*a* designates the same screen constitution data SD1*a* and the information data ID1*a* as that designated by the control data CD1*a*. The screen constitution data SD1*a* and the information data ID1*a* are not being stored in the internal storage area 190, but the information data ID2*a* representing the icon image and character string of the item 610 in the screen D3 is being stored. In the case where the screen D3 is to be displayed, the process of FIG. 6 is performed in the sequence NO in S415, NO in S440, S447. Then, the item 610 is displayed using the information data ID2*a* obtained in S545 of FIG. 7, and the other items 620 to 650 are displayed using the information data ID1*a* obtained in S547 of FIG. 7. Thus, the icon image on the screen can be changed when the information data ID2*a* is stored in the internal storage area 190, and therefore there is an increase in the flexibility of customization relating to displaying the image.

Next, a case will be described in which the item 610 in the screen D3 is selected. In the case where the item 610 is selected, the judging result of S105 of FIG. 4 is "YES", and the process proceeds to S115. Here, the control data CD2*a* designates the control data CD2*b* as the control data corresponding to the item 610 (see FIG. 3). The control data CD2*b* is stored in the internal storage area 190, and designates the screen constitution data SD2*a*, the information data ID2*b*, and the application AP2.

Since the control data CD2*b* is not being stored in the external storage area 300, the judging result of S115 of FIG. 4 is "NO", and the judging result of S140 is "YES". In S145, the processor 110 obtains the corresponding control data CD2*b* from the internal storage area 190, judges YES in S150 and, in S155, activates the application AP2.

The processor 110 causes the scanner unit 180 to perform scanning in accordance with the application AP2, and sends the scan data to the particular server 505. That is, the processor 110 performs the "SCAN to FTP" function. Further, the processor 110 performs S160 in parallel with sending the scan data.

Figure 10D:
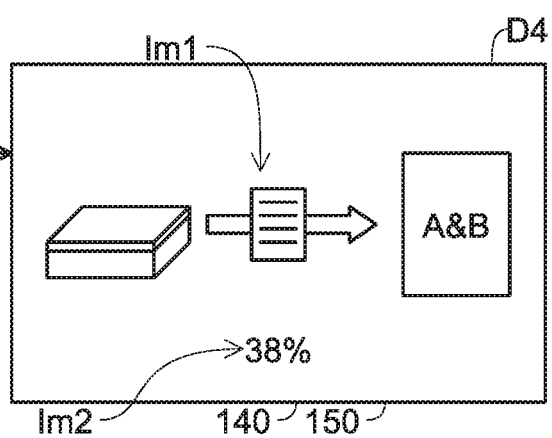
Figure 10E:
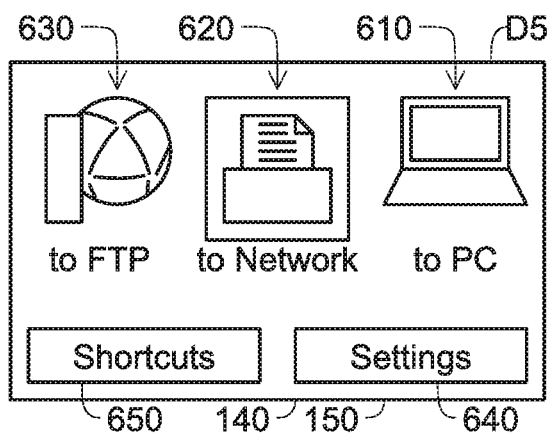

In S160, the processor 110 causes the display unit 140 to display a screen D4 of FIG. 10D in accordance with the control data CD2*b*. The screen D4 includes an image Im1 representing how scan data is sent from the multi-function device 100 to the server 505, and a numerical value Im2 representing progress in the sending of the scan data.

In S200 of FIG. 5, the processor 110 obtains the screen constitution data SD2*a* designated by the control data CD2*b* according to the procedure of FIG. 6. The judging result of S415 of FIG. 6 is "NO", and the judging result of S440 is "YES". In S445, the processor 110 obtains the corresponding screen constitution data SD2*a* from the internal storage area 190.

In S210 to S240 of FIG. 5, the processor 110 performs the imaging process on each item designated by the control data CD2*b*. For example, in the imaging process of FIG. 7, in S545 the processor 110 obtains the corresponding information data ID2*b* from the internal storage area 190 and, in S560 uses the information data ID2*b* to create image data representing the images Im1, Im2. In S250 of FIG. 5, using the image data created in S240, the processor 110 causes the display unit 140 to display the screen D4 of FIG. 10D. Moreover, although not shown, after the process of FIG. 5 has ended, the processor 110 periodically updates the numerical value Im2 representing progress.

As described above, the control data CD2*b* corresponds to the item 610 in the screen D3, and designates the application AP2. In the case where this kind of control data CD2*b* is stored in the internal storage area 190, the processor 110 activates the application AP2 in response to the item 610 in the screen D3 being selected. Thus, since it is possible to change the function to be performed by storing the control data CD2*b* in the internal storage area 190, there is an increase in the flexibility of customization relating to activating the application.

Further, in the case where the internal storage area 190 stores the control data CD2*a*, CD2*b* designating the application AP2 corresponding to the item 610, and does not store control data designating an application corresponding to the item 620, the processor 110 performs the process as follows. That is, in the case where the item 610 is selected, the processor 110 activates the application AP2 designated by the control data CD2*a*, CD2*b* and, in the case where the item 620 is selected, activates the application designated by the standard control data stored in the storage device 130. Thus, since it is possible to change the function of each item by storing the control data CD2*a*, CD2*b* in the internal storage area 190, there is an increase in the flexibility of customization relating to activating the application.

Although not shown, the control data CD2*a* also designates the standard control data corresponding to the other items 620 to 650 of FIG. 10C. The standard control data designates corresponding applications. As a result, in the case where any of the items 620 to 650 is selected, the processor 110 activates an application corresponding to the selected item (S155 of FIG. 4), and performs a process (i.e., function) corresponding to the selected item. For example, in the case where the item 620 is selected, the processor 110 activates an application AP3 for implementing the "SCAN to Network" function.

(Case of Using Control Data in External Storage Area (Priority Mode))

Next, a case will be described in which the corresponding control data is being stored in the external storage area 300. For example, in the case where the user wishes to customize some of the functions after purchasing the multi-function device 100, the memory card 300, in which the control data for customization, or the like is stored, is inserted into the multi-function device 100. Below, a case will be described in which the control data CD3 (see FIG. 3) in the external storage area 300 is control data corresponding to the icon image 82 of FIG. 9. Like the control data CD1*a* (see FIG. 2), the control data CD3 defines the five items 610 to 650. Further, the control data CD3 designates the screen constitution data SD1*a* and the information data ID1*a*, ID3.

In response to the icon image 82 of FIG. 9 being selected, the screen change condition is satisfied (YES in S105 of FIG. 4), and it is judged that the corresponding control data CD3 is stored on the memory card 300 (NO in S115). In this case, in S120 the processor 110 obtains the corresponding control data CD3 from the external storage area 300.

In the case where the process mode is "priority mode", the judging result of S125 is "NO", and the process proceeds to S150. Since the control data CD3 does not designate an application, the judging result of S150 is "NO". In S160, the processor 110 causes the display unit 140 to display the screen D5 of FIG. 10E in accordance with the control data CD3. In FIG. 10A and FIG. 10E, the icon images of the item 620 are different. This type of change of the icon image is realized by the control data CD3.

In S200 of FIG. 5, the processor 110 obtains the screen constitution data SD1*a* designated by the control data CD3. Here, since the screen constitution data SD1*a* is not being stored in the storage areas 190, 300, the screen constitution data SD1*a* is obtained in S447 of FIG. 6.

The information data ID3 of the item 620 of FIG. 10E is stored in the external storage area 300, and the information data ID1*a* of the other items 610, 630 to 650 is stored in the storage device 130. In the case where the target item is the item 620, the judging result of S515 of FIG. 7 is "YES", and in S520 the processor 110 obtains the corresponding information data ID3 from the external storage area 300. Then, in S560, by using the information data ID3, the processor 110 creates image data representing the item 620. The information data ID3 is different from the standard information data ID1*a*. Consequently, the image representing the item 620 in the screen D5 is different from the image representing the item 620 in the screen D1. Image data is created for the other items 610, 630 to 650, as in the case of FIG. 10A.

Although not shown, the control data CD3 also designates the standard control data corresponding to the items 610 to 650 of FIG. 10E. The standard control data designates a corresponding application. As a result, in the case where any of the items 610 to 650 is selected, the processor 110 activates the application corresponding to the selected item (S155 of FIG. 4), and performs a process (i.e., function) corresponding to the selected item.

Moreover, the control data CD2a, CD2b (see FIG. 3) for realizing the screens D3, D4 of FIG. 10C and FIG. 10D may be stored not in the internal storage area 190, but in the external storage area 300. In this case, in S120 of FIG. 4, the processor 110 obtains the control data CD2a, CD2b from the external storage area 300, and causes the display unit 140 to display the screens D3, D4 in accordance with the control data CD2a, CD2b. Thus, since it is possible to change the function, etc. by storing the control data in the external storage area, which is the memory card 300, there is an increase in the flexibility of customization relating to activating the application for providing the function.

Further, the internal storage area 190 may store the control data CD2a, CD2b, and further, the external storage area 300 may store the control data corresponding to the item 610. In this case, the control data in the external storage area 300 is used on a priority basis. In the case where the item 610 is selected, in S155 of FIG. 4 the processor 110 activates the application designated by the control data in the external storage area 300. Thus, since the control data in the external storage area 300 is prioritized over the control data in the internal storage area 190, it is possible to easily increase the flexibility of customization relating to activating an application by using the memory card 300. The user can further customize a display screen or the like from the control data in the internal storage area 190 that was stored by the administrator or the like of the multi-function device 100. Further, by setting the priority mode, the user can cause the multi-function device 100 to perform a process in accordance with the control data in the memory card 300 instead of the control data in the internal storage area 190. That is, by using the memory card 300, the user can perform customization updates easily. Moreover, control data corresponding to not only the item 610, but to other items (e.g., item 630) may be stored in the internal storage area 190 or the external storage area 300.

(Case of Using Control Data in External Storage Area 300 (Additional Mode))

Next, a process relating to "additional mode" will be described. A case is described in which both the control data CD3 stored in the external storage area 300, and the control data CD2a stored in the internal storage area 190 are control data corresponding to the icon image 82 of FIG. 9. Below, the corresponding control data in the external storage area 300 is called "external corresponding control data", and the corresponding control data in the internal storage area 190 is called "internal corresponding control data".

Since the external storage area 300 is storing the control data CD3, the judging result of S115 of FIG. 4 is "YES". In this case, in S120 the processor 110 obtains the external corresponding control data CD3 from the external storage area 300. In the case where the process mode is "additional mode", the judging result of S125 is "YES", and the process proceeds to S130.

In S130, the processor 110 judges whether the internal storage area 190 is storing the corresponding control data. Since the internal storage area 190 is storing the corresponding control data CD2a, the judging result of S130 is "YES", and the process proceeds to S135. In S135, the processor 110 adopts the part which, among the internal corresponding control data CD2a in the internal storage area 190, does not conflict with the external corresponding control data CD3 in the external storage area 300. In the present embodiment, among the data designated by the external corresponding control data CD3, the part which designates standard data determined in advance in the storage device 130 is treated as a part (that is, uncompetitive data) that does not conflict with the other control data. Then, among the data designated by the external corresponding control data CD3, the part designating data not included in the standard data is treated as a part (that is, competitive data) that conflicts with the other control data. Among the data designated by the external corresponding control data CD3 obtained in S120, the processor 110 replaces the data not conflicting with the other control data by the data designated by the internal corresponding control data CD2a.

For example, among the external corresponding control data CD3, the information data ID3 corresponding to the item 620 (FIG. 10E) conflicts with the other control data. On the other hand, the other part among the external corresponding control data CD3 does not conflict with the other control data. Consequently, the processor 110 overwrites the information data ID1a designated by the external corresponding control data CD3 with the control data CD2b and the information data ID1a, ID2a designated by the internal corresponding control data CD2a. Below, the control data obtained by combining the external corresponding control data CD3 and the internal corresponding control data CD2a is also called "composite control data".

Figure 10F:
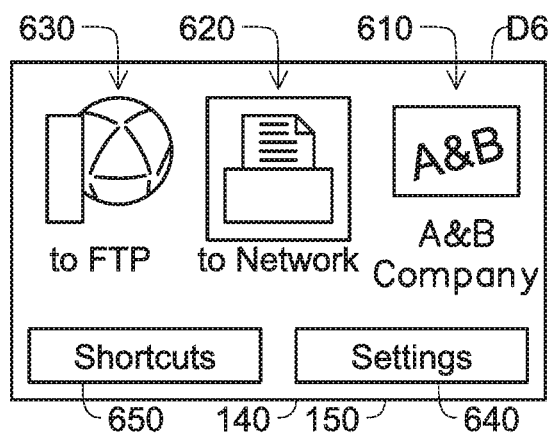

Each process S150, S155, S160 of FIG. 4 is performed in accordance with the composite control data. A screen D6 of FIG. 10F shows a screen represented in accordance with the composite control data. An image corresponding to the item 620 is an image represented by the information data ID3 designated by the external corresponding control data CD3 (i.e., the same image as the item 620 in the screen D5). The image corresponding to the item 610 is an image represented by the information data ID2a designated by the internal corresponding control data CD2a (i.e., the same image as the item 610 in the screen D3). Then, in the case where the user selects the item 610, processing is performed (see the screen D4) in accordance with the control data CD2b designated by the internal corresponding control data CD2a.

Thus, since it is possible to change the image by using the information data ID2a in the internal storage area 190 and the information data ID3 in the external storage area 300, there is an increase in the flexibility of customization relating to providing the display and function of the image. For example, customization of the function is performed by the administrator or the like of the multi-function device 100 and, further, in case of individual users wishing to display a customized icon image (in a case where objects of customization are different), composite customization is realized, by selecting additional mode, in which the control data in both the internal storage area 190 and the external storage area 300 is used.

Further, since the control data in the internal storage area 190 or the external storage area 300 is read instead of the control data in the storage device 130, it is not necessary to perform a firmware update in the storage device 130. Consequently, customization can be performed easily. Further, since the priority of reading the control data is the external storage area 300, the internal storage area 190, and the storage device 130, the customization desired by the end user can be realized on a priority basis.

(Selection of Process Mode)

Figure 8:
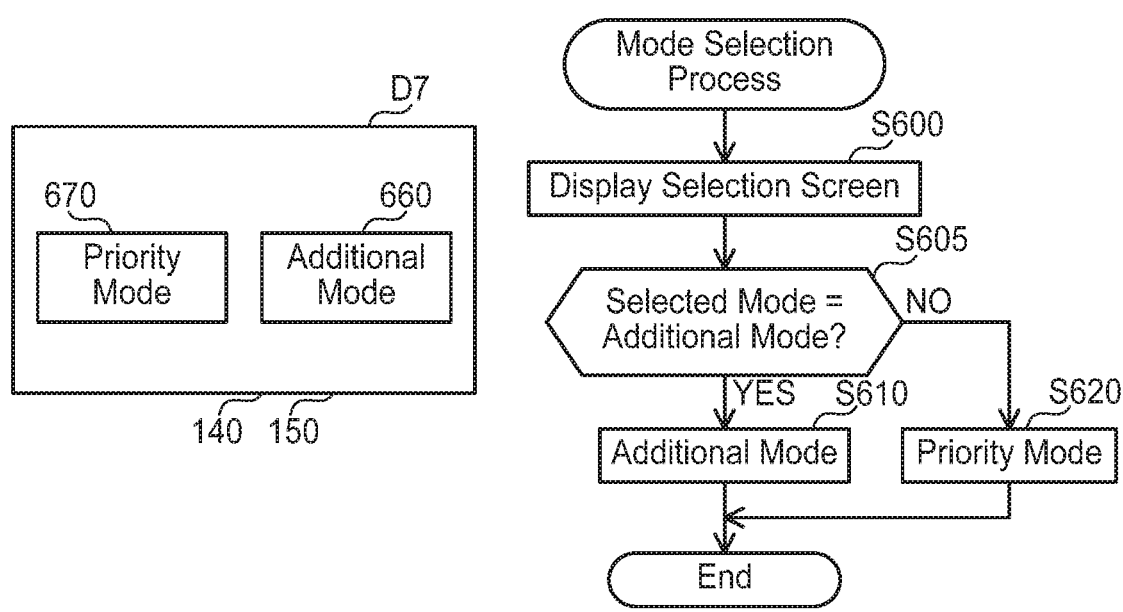
FIG. 8 shows a flowchart of a mode selection process.

FIG. 8 is an explanatory diagram of the process for selecting the process mode. The processor 110 starts a mode selection process in response to e.g., the user selecting the settings button 640 of FIG. 10A. The mode selection process is realized by a standard application corresponding to the settings button 640. In S600, the processor 110 causes the display unit 140 to display a selection screen D7. The selection screen D7 includes a button 660 for selecting "additional mode", and a button 670 for selecting "priority mode". In S605, the processor 110 judges whether the button 660 was selected. In the case of "YES" in S605, in S610 the processor 110 sets the process mode to "additional mode", and ends the process of FIG. 8. In the case of "NO" in S605, in S620 the processor 110 sets the process mode to "priority mode", and ends the process of FIG. 8. The processor 110 performs the control process of FIG. 4 in accordance with the process mode selected by the user. Consequently, there is an increase in the flexibility of customization of processing in the multi-function device 100.

(Modifications)

(1) Various other procedures can be adopted as the procedures of the control process instead of the procedures described in FIG. 4 to FIG. 7. For example, the process mode may be fixed as either one of "priority mode" and "additional mode". Further, in the procedure of FIG. 4, the processor 110 uses the data in the external storage area 300 in priority to the data in the internal storage area 190. However, the data in the internal storage area 190 may be used in priority to the data in the external storage area 300. Further, the external storage area 300 may not be a memory card, but may be a storage area provided inside the multi-function device 100. That is, the multi-function device 100 may have a plurality of storage areas, and the priority for reading each storage area may be set in advance.

(2) Any other method may be adopted, instead of the method described above, as the method for judging whether the data in the internal storage area 190 and the data in the external storage area 300 conflict. For example, the control data may include a flag indicating whether the data within that control data conflicts with the other control data. Similarly, the screen constitution data may include a flag indicating whether the data within that screen constitution data conflicts with the other screen constitution data. Further, the information data may include data identifying, within the image represented by the information data, parts which conflict with other information data and parts which do not conflict.

(3) Various other configurations, instead of the configuration described above, may be adopted as the configuration of the data used in the control process. For example, the application corresponding to the item 610 in the screen D3 may be designated by the control data CD1a and not by the control data CD1b. Further, at least one of the screen constitution data and the information data may be omitted.

Further, in the embodiments described above, a case using the customized control data was described. Instead, a configuration may be adopted in which the standard control data in the storage device 130 is read, and a customized screen is displayed by reading at least one of the screen constitution data and the information data from the storage area 190 or 300.

For example, in the case where the screen constitution data indicating the style of the screen D2 of FIG. 10B is being stored in the storage area 190 or 300, the processor 110 may cause the display unit 140 to display the screen D2 in accordance with that screen constitution data. The screen constitution data may designate attributes different from the attributes designated by the standard screen constitution data SD1b as the attributes (e.g., size of the icon image) of the items 710, 720. On the other hand, in the case where this kind of screen constitution data for customization is not being stored in either of the storage areas 190, 300, the processor 110 may cause the display unit 140 to display the screen D2 in accordance with the attributes designated by the predetermined standard screen constitution data SD1b. According to this configuration, since it is possible to change the attributes of the screen by storing the screen constitution data in the storage area 190 or 300, there is an increase in the flexibility of customization for changing the attributes.

Further, in the case where information data corresponding to at least one of the items 610 to 650 in the screen D1 of FIG. 10A is stored in the storage area 190 or 300, the processor 110 may create image data representing the icon image in accordance with that information data. The information data may represent an icon image different from the standard information data ID1a. On the other hand, in the case where this kind of information data for customization is not being stored in either of the storage areas 190, 300, the processor 110 may cause the display unit 140 to display an icon image represented by the predetermined standard information data ID1a. According to this configuration, since it is possible to change the icon image by storing the information data in the storage area 190 or 300, there is an increase in the flexibility of customization for changing the icon image. In general terms, an image change may be performed independently for each of the one or more items in the screen.

(4) Various other configurations may be adopted, instead of the configuration described above, as the configuration of the device for performing the control process (here, the multi-function device 100). For example, the storage device 130 and the internal storage area 190 may be provided in the same storage device. Further, the application designated by the control data for customization may be stored in the internal storage area 190 or the external storage area 300 instead of the storage device 130. Further, a plurality of applications in the storage device 130 may be realized by sharing a plurality of standard functions. In this case, the entirety of the plurality of applications can be considered to be realizing the applications that can be provided by the plurality of standard functions.

The device I/F 160 may be omitted. In this case, the processor 110 may perform the control process by using the data in the storage device 130 and the data in the internal storage area 190. Further, the internal storage area 190 may be omitted. In this case, the processor 110 may perform the control process by using the data in the storage device 130 and the data in the external storage area 300. Further, the internal storage area 190 may be a storage area in which the rewriting of data is prohibited.

The display unit 140 may be omitted. In this case, the processor 110 may display the screen in a display device connected to the multi-function device 100. Further, the operation unit 150 may be omitted. In this case, the processor 110 may receive an operation of the user from an operation unit (e.g., mouse) connected to the multi-function device 100. Further, the communication I/F 170 may be omitted. Further, any data processing device for performing another data process may be adopted instead of the multi-function device 100 as the device for performing the control process. For example, a printer, scanner, so-called smartphone, etc. may be adopted.

In any case, any number of one or more may be adopted as the number of items to be displayed on the screen. Any function may be adopted as the standard function to be performed by selecting the item, and the function is not restricted to the case described above.

(Correspondence Relationship)

The multi-function device 100 is an example of "image processing device". The first non-volatile storage device 130 is an example of "first storage device". The second non-volatile storage device 190 or the memory card 300 is an example of "second storage device". The second non-volatile storage device 190 and the memory card 300 are examples of "internal storage device" and "external storage device", respectively.

The screen D1 of FIG. 10A, the item 610 in the screen D1, the "SCAN to PC" function, and the application AP1 are examples of "first item selection screen", "first item image", "first function", and "first application program", respectively. The one item 610, and the two items 620, 630 in the screen D1 are examples of "one item image" and "(N-1) pieces of item images", respectively. The control data CD2a (or CD3), and the control data CD2b of FIG. 3 are examples of "first program control data" and "particular program control data", respectively. The screen D3 of FIG. 10C, the item 610 in the screen D3, the "SCAN to FTP" function, and the application AP2 are examples of "second item selection screen", "second item image", "second function" and "second application program", respectively. The screen constitution data SD2a of FIG. 3, the information data ID2b, and the images Im1, Im2 in the screen D4 of FIG. 10D are examples of "first screen constitution data", "first information data" and "particular information image", respectively. The screen constitution data SD1a and the information data ID2a of FIG. 3 are examples of "second screen constitution data" and "second information data", respectively. The item 620 in the screen D3 of FIG. 10C, the "SCAN to Network" function, and the application AP3 are examples of "third item image", "third function" and "third application program", respectively. The screen D4 of FIG. 10D is an example of "function related screen which is related to the second function".

In the additional mode, the control data CD3 and the control data CD2a of FIG. 3 are examples of "first program control data" and "second program control data", respectively. The screen constitution data SD1a, the information data ID3, and the information data ID2a are examples of "second screen constitution data", "second information data" and "third information data", respectively. The screen D6 of FIG. 10F, the item 620 in the screen D6, and the item 610 are examples of "second item selection screen", "second item image" and "third item image", respectively.

Second Embodiment

Next, a second embodiment will be described. The control data is classified into either an activation script which is activated (i.e., used) in response to an operation on the operation unit 150, and a normal script (simply called "script" below) designated by the activation script. In the present embodiment, instead of the control data CD1 to CD3 (see FIG. 2, FIG. 3) of the first embodiment, processes are realized in accordance with the activation script and the script.

(Process Using Internal Processing Program 134)

Figure 11:
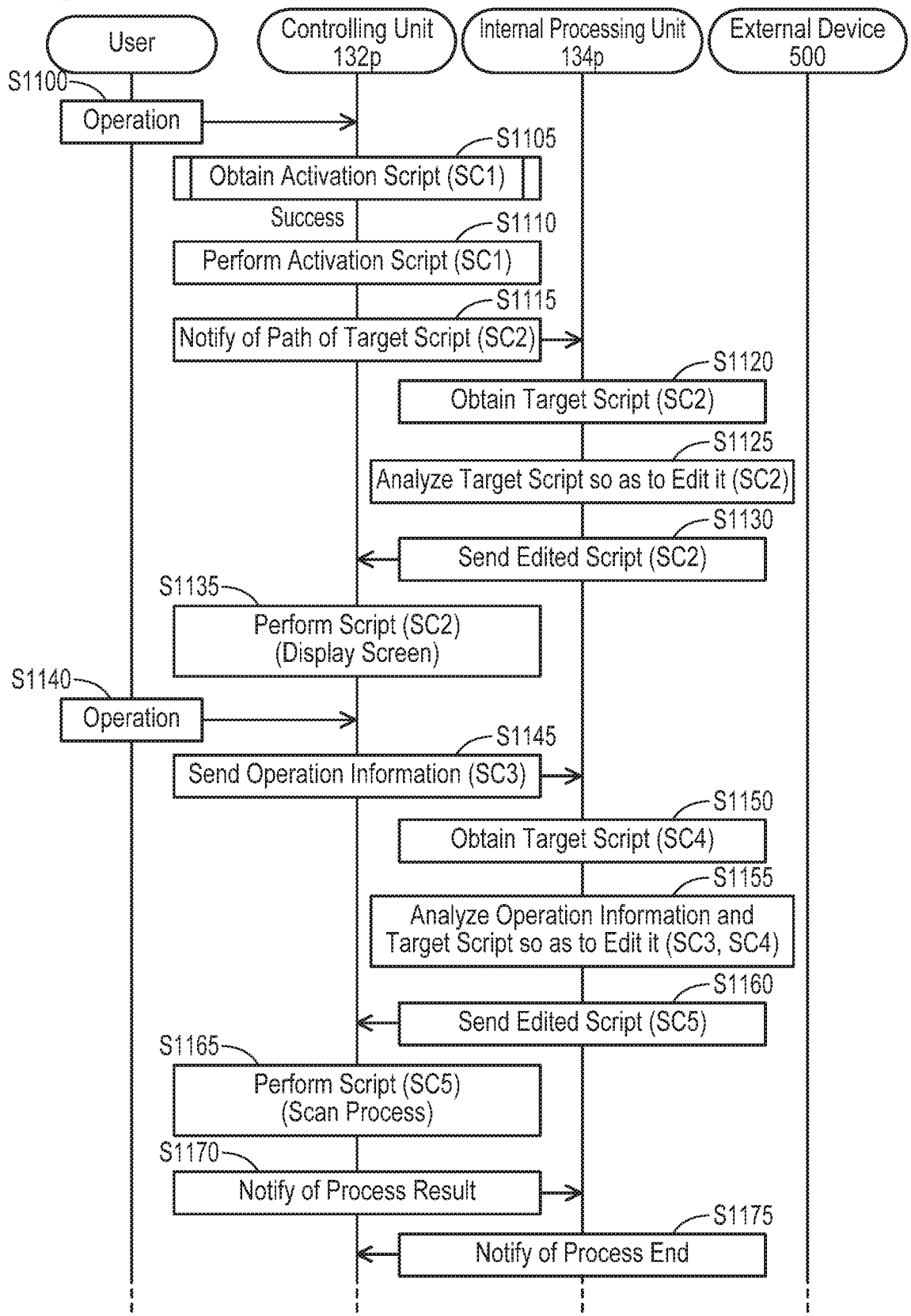
FIG. 11 shows a sequence diagram of a case in which obtaining an activation script succeeds.

FIG. 11 shows a process of the user, a process of a controlling unit 132p, a process of an internal processing unit 134p, and a process of an external device (here, the server 500). The controlling unit 132p is realized by the processor 110 performing the main program 132 (see FIG. 2). The internal processing unit 134p is realized by the processor 110 performing the internal processing program 134 (see FIG. 2). Below, contents of the process of FIG. 11 will be described using, as an example, a case where the user selects the icon image 82 of FIG. 9.

In S1100, the user performs an operation for selecting the icon image 82 of FIG. 9. In S1105, the controlling unit 132p obtains an activation script SC1 in response to the icon image 82 being selected.

Figure 12:
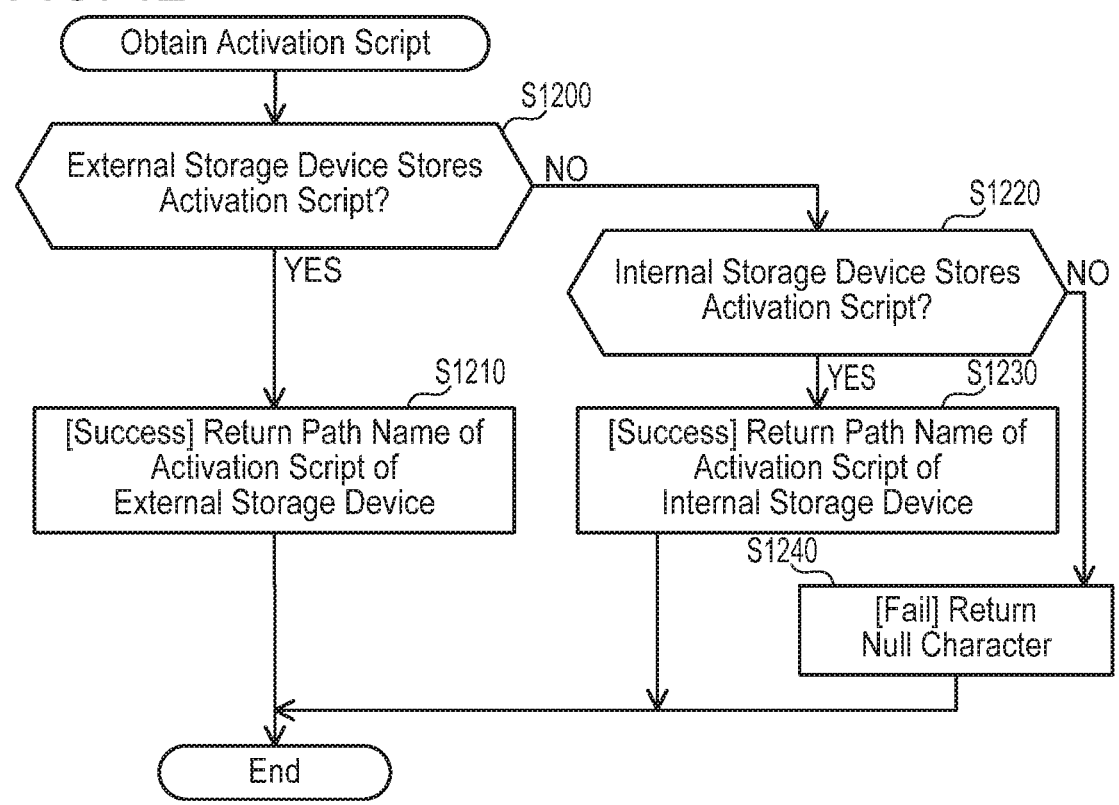
FIG. 12 shows a flowchart of an activation script obtaining process.

FIG. 12 is a flowchart of an activation script obtaining process. In S1200, the controlling unit 132p judges whether the external storage device, which is the memory card 300 connected to the device I/F 160, is storing the activation script SC1. Data having a predetermined path name is used as the activation script SC1. The path name is information for specifying a storage location of a data file used in a file system for managing the data files stored in the memory card 300. The path name, for example, indicates a character string representing a directory tree hierarchy. In the case where the activation script SC1 having the predetermined path name is being stored in the memory card 300, the judging result of S1200 is "YES". In the case where the memory card 300 is not connected to the device I/F 160, or the activation script SC1 having the predetermined path name is not being stored in the memory card 300, the judging result of S1200 is "NO".

In the case of "YES" in S1200, in S1210 the controlling unit 132p adopts the path name of the activation script SC1 in the memory card 300 as the path name of the activation script SC1 to be used in the process. For example, that path name is set as the return value of the process of S1105 of FIG. 11. Then, the process of FIG. 12 ends.

In the case of "NO" in S1200, in S1220 the controlling unit 132p judges whether the internal storage device, which is the storage device 190, is storing the activation script SC1. In the case where the activation script SC1 having the predetermined path name is being stored in the internal storage device 190, the judging result of S1220 is "YES". In the case where the activation script SC1 having the predetermined path name is not being stored in the internal storage device 190, the judging result of S1220 is "NO".

In the case of "YES" in S1220, in S1230 the controlling unit 132p adopts the path name of the activation script SC1 in the internal storage device 190 as the path name of the activation script SC1 to be used in the process. Then, the process of FIG. 12 ends.

In the case of "NO" in S1220, in S1240 the controlling unit 132p adopts a particular character string (e.g., null characters), indicating that obtaining the activation script SC1 failed, as the path name of the activation script SC1. Then, the process of FIG. 12 ends.

FIG. 11 shows a process in the case where obtaining the activation script SC1 succeeded. The process of FIG. 11 is performed in the case where the activation script SC1 is being stored in the memory card 300 (YES in S1200 of FIG. 12), or in the case where the activation script SC1 is being stored in the storage device 190 (YES in S1220 of FIG. 12). The description below continues using, as an example, the case where the activation script SC1 including a plurality of scripts is being stored in the memory card 300.

In S1110, the controlling unit 132p performs analysis of the activation script SC1 having the path name obtained in S1105. FIG. 13 shows an example of the activation script SC1.

The activation script SC1 includes a function "try_start_custom_app" that is called at the time of performing. An argument appid shows a number (called "application number appid" below) for identifying an application corresponding to the icon image 82 (see FIG. 9).

In a first part P11 in the function, a custom application number custom_appid corresponding to the application number appid is obtained. The custom application number custom_ appid shows a number for identifying a customized process. The correspondence relationship between the application number appid and the custom application number custom_ appid may be defined in a part of the activation script SC1 that is not shown. In the case where a definition is not present in the activation script SC1, the custom application number custom_appid is set to zero.

In a second part P12 in the function, in the case where the custom application number custom_appid is defined, a process identified by the custom application number custom_appid (called "custom process" below) is started. The custom process may be defined in a part of the activation script SC1 that is not shown.

In a third part P13 in the function, in the case where the custom application number custom_appid is not defined, the function of the application identified by the application number appid is performed.

In the present embodiment, the case is described, as an example, in which the custom application number custom_appid and the custom process are defined in a part of the activation script SC1 that is not shown. In this case, the controlling unit 132p starts the custom process in accordance with the second part P12. Below, the case is described, as an example, in which the custom process is defined as a process based on a second script SC2. That is, information indicating that the script of the next process target is the second script SC2 is described in the activation script SC1. The second script SC2 is stored in the same storage device as the storage device storing the activation script SC1 (i.e., here, the memory card 300).

In S1115 of FIG. 11, the controlling unit 132p notifies the internal processing unit 134p of the path name of the second script SC2, which is the script of the next process target. In S1120, the internal processing unit 134p obtains the script of the process target specified by the path name (i.e., here, the second script SC2; called "target script" below). In S1125, the internal processing unit 134p performs a script analyis program (not shown), and analyzes and edits the target script SC2. In the present embodiment, the target script includes a script part described using Lua. A script analysis program performs language processing on the Lua script part. Moreover, in a modification, any language may be adopted instead of Lua, such as Ruby, Perl, etc.

FIG. 14 shows an example of the second script SC2. The second script SC2 represents the configuration of the screen displayed on the display unit 140. Specifically, the second script SC2 shows that a title of the screen is "ScanSetting", that "Color" and "Mono" are displayed as color mode options, and that a button indicating "Start" is displayed. Further, the part P21 in the second script SC2 shows a path name of a fourth script SC4, which is the script of the process target subsequent to the second script SC2. The fourth script SC4 is stored in the same storage device as the storage device storing the scripts SC1, SC2 (i.e., here, the memory card 300).

The second script SC2 does not include a tag for editing. Consequently, in S1125 of FIG. 11 the internal processing unit 134p uses the second script SC2, as is, as the edited script. As described later, the script can include a tag for editing. In this case, the internal processing unit 134p analyzes the part specified by the tag for editing, and edits the script in response to the analysis results. In S1130, the internal processing unit 134p sends the second script SC2, which is the edited script, to the controlling unit 132p. In the case where the second script SC2 includes a tag for editing, the second script SC2 is edited in response to the analysis results of the part specified by the tag for editing, and the edited script is sent to the controlling unit 132p.

In S1135, the controlling unit 132p performs the script SC2. The second script SC2 shows the configuration of the screen displayed on the display unit 140. The controlling unit 132p causes the display unit 140 to display a screen D12 of FIG. 18A in accordance with the second script SC2. The screen D12 includes the title "Scan Setting", a button B21 indicating "Start", and two buttons B22, B23 indicating two options for color mode (i.e., "Color" and "Mono"). The user can select the color mode by operating the desired option among the two buttons B22, B23, and can cause the multi-function device 100 to start the scan process by operating the button B21.

In S1140 of FIG. 11, the user operates the button B21. In S1145, the controlling unit 132p creates operation information SC3 in response to the button B21 being operated, and sends the operation information SC3 to the internal processing unit 134p. The operation information SC3 indicates information (i.e., color Mode) inputted to the screen D12 of FIG. 18A. FIG. 15 shows an example of the operation information SC3, and the operation information SC3 indicates that "Color" has been selected as the color mode.

In S1150 of FIG. 11, the internal processing unit 134p obtains the script SC4 of the next process target specified in S1125. In S1155, the internal processing unit 134p analyzes the operation information SC3 and the script SC4 using a script analysis program, and edits the script SC4.

FIG. 16 shows an example of the fourth script SC4, and FIG. 17 shows an example of a fifth script SC5 obtained by editing the fourth script SC4. The part between the two tags (i.e., <scan>, </scan>) indicates the setting of the scan process. For example, the value "high" of the element "resolution" indicates that resolution is high.

The value of the element "send_host" indicates the host name of the scan data destination (in other words, also called "domain name"), and is described using an element "script". The element "script" is an element for editing. The internal processing unit 134p analyzes the part between the two tags (i.e., <script>, </script>), and replaces it with the analysis results. In this example, the part from start tag <script>to end tag </script> is replaced with the value of the variable "file_server_hostname". This variable indicates the host name on a network of a file server (i.e., the PC 510) registered in advance in the multi-function device 100 by the user. The value of the element "send_host" is replaced with the host name of the PC 510 (here, "PC1"). The PC 510 is a computer capable of receiving scan data, and is e.g., a computer containing a publicly shared folder for file sharing.

The fourth script SC4 further includes an edit part P41 for describing the element "script". In the edit part P41, processing branches in response to whether the parameter set by the user, i.e., the parameter identified by the identifier "ColorMode", is "Color". The value of the parameter is specified by the operation information SC3. For example, in the case where the parameter is "Color", the edit part P41 is replaced with "<color_mode>color </color_mode>". That is, the value of the element "color_mode" is set to "color". As a result, the fifth script of FIG. 17 is completed. Moreover, in the case where the parameter is not "Color", the edit part P41 is replaced with "<color_mode>mono</color_mode>".

In S1160 of FIG. 11, the internal processing unit 134*p* sends the fifth script SC5 to the controlling unit 132*p*. In S1165, the controlling unit 132*p* performs the fifth script SC5. Specifically, the controlling unit 132*p* interprets the tag <scan>in the fifth script SC5 as a command for the scan process, and performs the scan process.

Figure 18A:
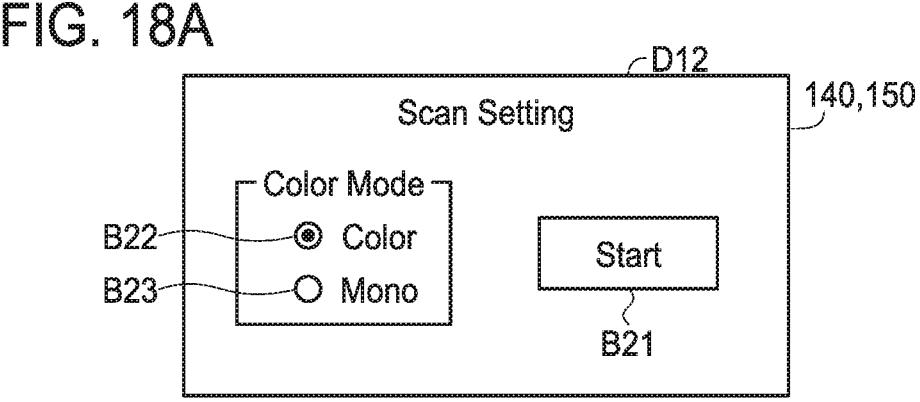
FIG. 18A and FIG. 18B show screens related to the scan function.
Figure 18B:
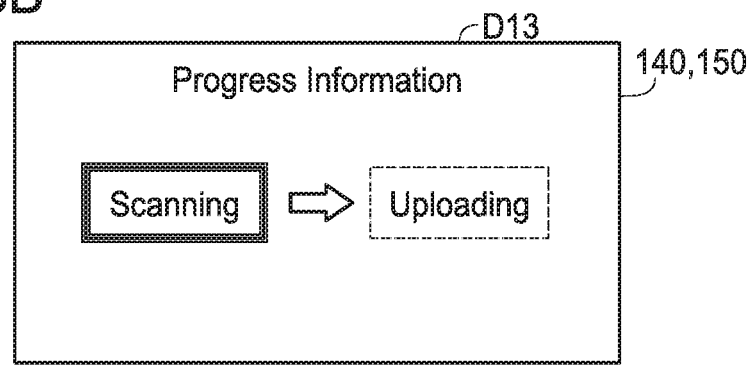

FIG. 18B shows an example of a screen D13 displayed in S1165. The scan process specified by the fifth script SC5 includes a process for creating scan data by using the scanner unit 180 (FIG. 1), and a process for uploading the scan data to a destination. The screen D13 indicates the progress of these processes.

In the present embodiment, the application AP2 (see FIG. 2) implements the process for creating scan data, and the process for uploading the scan data. The controlling unit 132*p* activates the application AP2, and performs the scan process in accordance with the settings shown in the fifth script SC5. Then, the controlling unit 132*p* periodically updates the screen D13 showing the progress.

When the scan process ends, in S1170 of FIG. 11 the controlling unit 132*p* notifies the internal processing unit 134*p* of the process result. Information designating the script of the next process target is not described in the fourth script SC4 (see FIG. 17). Consequently, in S1175, the internal processing unit 134*p* notifies the controlling unit 132*p* of process end without obtaining a script of a next process target. Then, the process of FIG. 11 ends.

Thus, in the present embodiment, the internal processing unit 134*p* creates a script for controlling the screen by using the second script SC2 (S1125). Consequently, the second script SC2 is creation information for creating a script for controlling the screen displayed on the display unit 140. Below, the second script SC2 may be called "creation information SC2".

Further, the second script SC2 and the fourth script SC4 are used in processes subsequent to performing the activation script SC1. Consequently, in the case of performing customization using the scripts SC1, SC2, SC4, these scripts SC1, etc. are all stored in the memory card 300 or the storage device 190. Thus, in the case where the activation script SC1 is obtainable, the creation information SC2 is usually also obtainable. Consequently, in S1200, S1220 of FIG. 12, it is judged whether the creation information SC2 is obtainable by judging whether the activation script SC1 is obtainable.

(Process Using Server 500)

Figure 19:
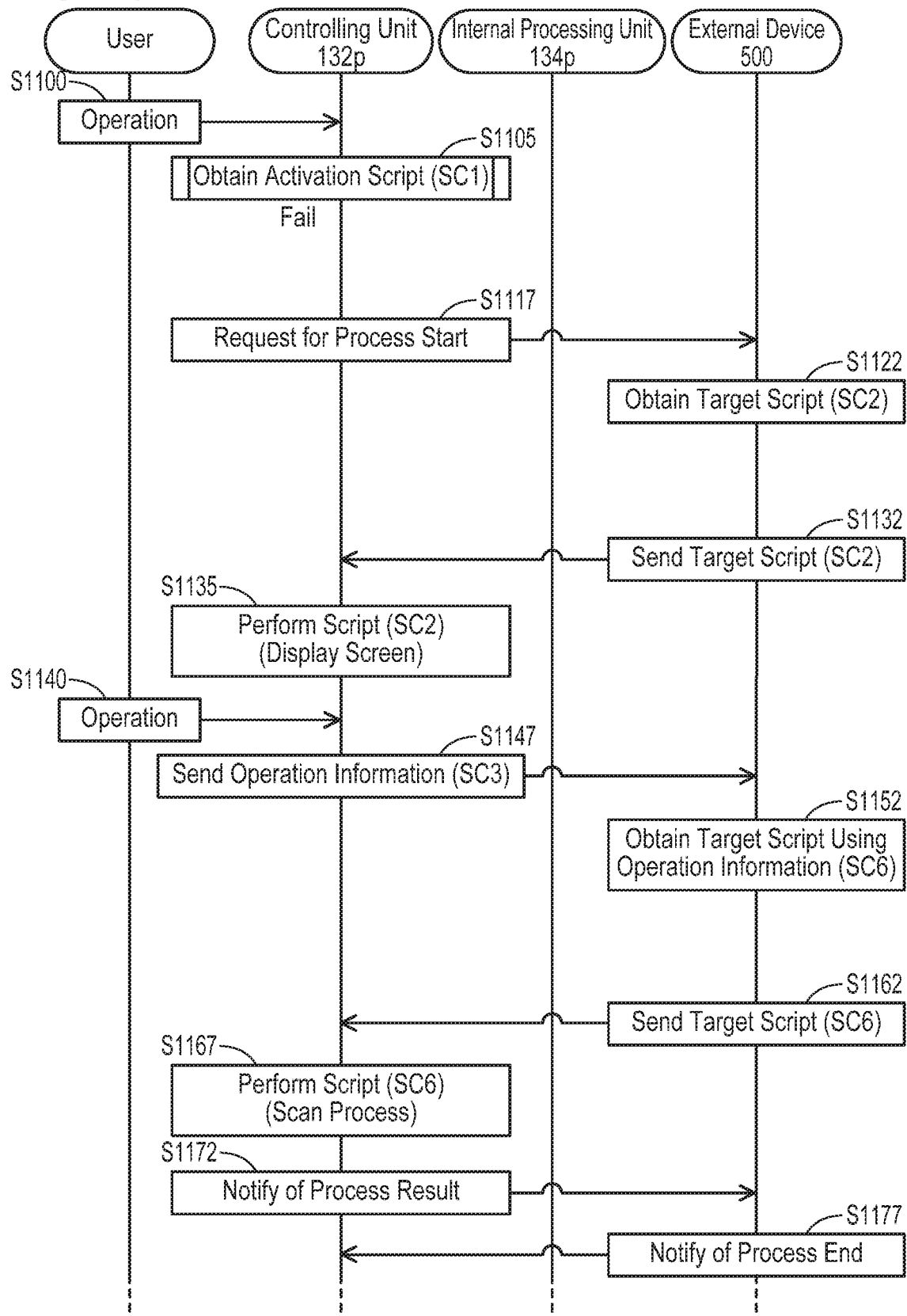
FIG. 19 shows a sequence diagram of a case in which obtaining the activation script fails.

FIG. 19 is a sequence diagram showing an example in which obtaining the activation script SC1 failed. In S1100, as in S1100 of FIG. 11, the icon image 82 of FIG. 9 is selected. However, in the present embodiment, the storage device 190 and the memory card 300 are not connected to the multi-function device 100 and, further, the activation script SC1 is not present in the storage device 130. Consequently, the process result of S1105 is "Fail". In this case, in S1117, the controlling unit 132*p* activates the application AP1 and sends, in accordance with the application AP1, a request for process start, which includes selection information indicating that the icon image 82 has been selected, to the server 500. In the present embodiment, the application AP1 is a program for implementing a "SCAN to E-mail" function in conjunction with the server 500. Moreover, the "SCAN to E-mail" function is an example, and the function realized by the application AP1 may be, e.g., a scan uploading function in conjunction with the server 500.

The processor 500*a* (see FIG. 1) of the server 500 implements various processes by performing the program 500*d*. In S1122, the processor 500*a* obtains the script of the process target from the non-volatile storage device 500*c* in response to the request from the multi-function device 100. Specifically, the processor 500*a* obtains a script that has been previously associated with the selection information included in the request. The script is the same as the script SC2 (see FIG. 14) of S1130 of FIG. 11. Moreover, in the present embodiment, the second script SC2 has been stored in advance in the non-volatile storage device 500*c*. However, in a modification, the processor 500*a* may create the second script SC2. In S1132, the processor 500*a* sends the second script SC2 to the multi-function device 100.

S1135, S1140 are the same as S1135, S1140 of FIG. 11. In S1147, the controlling unit 132*p* sends the operation information SC3 to the server 500.

In S1152, the processor 500*a* obtains the script of the process target by using the operation information SC3. The program 500*d* designates, in advance, a sixth script SC6 as a script of the process target subsequent to the second script SC2.

FIG. 20 shows an example of the sixth script SC6. The sixth script SC6 is different from the fifth script SC5 of FIG. 17, in that the element "send_address" is described instead of the element "send_host". The address "user1@com" described in the element "send_address" is registered by the user in advance in the server 500. The non-volatile storage device 500*c* is storing in advance a template of the sixth script SC6. The value of the element "send_address" and the value of the element "color_mode" in the template are predetermined values (e.g., blank). The processor 500*a* obtains the template, describes the pre-registered address "user1@com" in the element "send_address", and describes the value ("color" or "mono") indicating the parameter (ColorMode) of the operation information SC3 in the element "color_mode", thereby creating the sixth script SC6. In S1162 of FIG. 19, the processor 500*a* sends the sixth script SC6 to the multi-function device 100.

In S1167, the controlling unit 132*p* performs the scan process in accordance with the application AP1 and the sixth script SC6. In S1167, the controlling unit 132*p* creates an email to which the scan data is attached, and sends the email to the mail server 505 belonging to the external network GNT. As a result, the mail server 505 sends the email to the address "user1@com". In S1172, the controlling unit 132*p* notifies the server 500 of the process result. The processor 500*a* notifies the multi-function device 100 of process end. Thereby, the process of FIG. 19 ends.

(Process Not Performed on Target of Customization)

Figure 21:
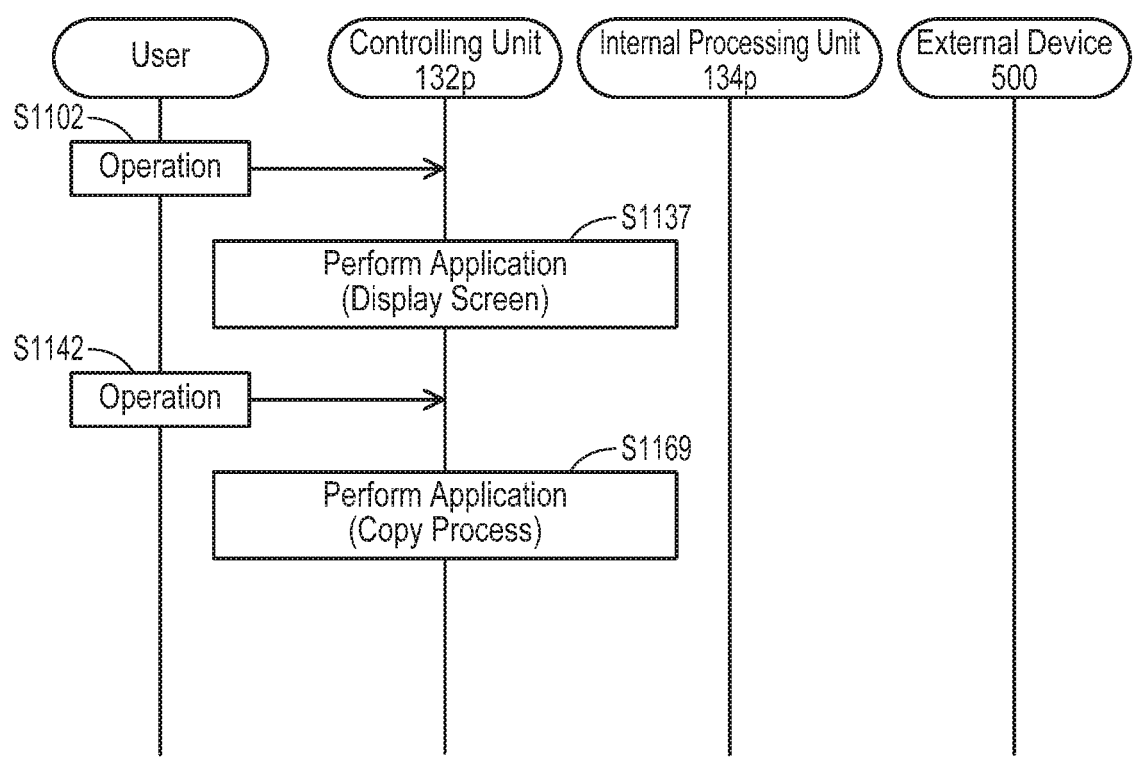
FIG. 21 shows a sequence diagram of a case in which a normal function, not a customized function, is performed.

FIG. 21 shows a process example in which an operation is performed on an item that is not a target of customization. Below, the contents of the process of FIG. 21 will be described using, as an example, the case where the icon image 81 of FIG. 9 is selected.

In S1102, the user selects the icon image 81. In S1137, the controlling unit 132*p* activates the application AP4 corresponding to the icon image 81. The application AP4 implements the copy function in which the user is caused to input the copy setting, the scanner unit 180 is driven to create scan data in accordance with the setting, and the printer unit 185 is driven to print an image using the scan data.

In S1137 of FIG. 21, the controlling unit 132*p* causes the display unit 140 to display a setting screen D14 of FIG. 22A. The screen D14 includes a title "Copy Setting", a "Start" button B41, and two options B42, B43 for color mode. The user can select the color mode by selecting the desired option among the two options B42, B43, and can cause the multi-function device 100 to start the copy by operating the button B41.

In S1142, the user operates the button B41. In S1169, in accordance with the application AP4, the controlling unit 132p creates scan data in accordance with the setting indicated by the selected option, and prints an image using the scan data. FIG. 22B shows an example of a screen D15 displayed in S1167. The screen D15 indicates the progress of the copy process. When the print of the image is completed, the process of FIG. 21 ends.

As described above, in the present embodiment, in the case where the item selected by the user is a customization target, the process is changed in response to whether the activation script SC1 is obtainable, i.e., whether the creation information SC2 is obtainable. In the case where the creation information SC2 is obtainable, as described in FIG. 11, in S1125 the internal processing unit 134p creates a screen controlling script (the same as the creation information SC2 in the example of FIG. 14) by using the creation information SC2. In S1135, the controlling unit 132p causes the display unit 140 to display the screen D12 (FIG. 18A) in accordance with the screen controlling script, and performs the scan process (S1145 to S1165) using the operation information SC3 corresponding to the operation on the operation unit 150. On the other hand, in the case where the creation information SC2 is not obtainable, as described in FIG. 19, the controlling unit 132p obtains the screen controlling script SC2 from the server 500 (S1132), and causes the display unit 140 to display the screen D12 (FIG. 18A) in accordance with the screen controlling script (S1135). Then, the controlling unit 132p performs the scan process (S1147 to S1167) by using the operation information SC3 corresponding to the operation on the operation unit 150.

Thus, the internal processing unit 134p can create the screen controlling script from the creation information SC2. Consequently, based on the creation information SC2, the controlling unit 132p can easily customize processing by the multi-function device 100. As a result, the flexibility of customization increases.

Further, the user of the multi-function device 100 may wish to perform image processing within the internal network LNT without sending data to the server 500 that is external to the internal network LNT. In the present embodiment, as shown in FIG. 11, since it is possible to obtain the screen controlling script from the internal processing unit 134p, the controlling unit 132p can perform processing without communicating with the server 500 that is external to the internal network LNT.

Further, as described in S1220 of FIG. 12, in the case where the activation script SC1 is being stored in the storage device 190, the controlling unit 132p judges that the creation information SC2 is obtainable. Consequently, since it is possible to change the processing in the multi-function device 100 by storing the creation information SC2 in the internal storage device 190 of the multi-function device 100, there is an increase in the flexibility of customization of processing in the multi-function device 100.

Further, as described in S1200, in the case where the memory card 300 is connected to the device I/F 160, and the activation script SC1 (i.e., the creation information SC2) is being stored in the memory card 300, the controlling unit 132p judges that the creation information SC2 is obtainable. Consequently, since it is possible to change the processing in the multi-function device 100 by storing the creation information SC2 in the memory card 300 connected to the device I/F 160, there is an increase in the flexibility of customization of processing in the multi-function device 100.

In the scan process of FIG. 11 (i.e., S1165), the scan data is sent to the PC 510 connected to the internal network LNT. On the other hand, in the scan process of FIG. 19 (i.e., S1167), the scan data is sent to the server 505 connected to the external network GNT. Thus, by using the creation information SC2, it is possible to select the scan data destination from among the device belonging to the external network GNT (here, the server 505) and the device belonging to the internal network LNT (here, the PC 510). As a result, there is an increase in the flexibility of customization of processing in the multi-function device 100.

Further, as shown in FIG. 14, the creation information SC2 is described in XML markup language. Then, as described in S1125, S1155 of FIG. 11, the internal processing unit 134p analyzes the target part specified by the tag for editing (i.e., <script>, </script>), and creates the edited script by changing the target part in response to the analysis results. In the example of FIG. 14, the tag for editing is not present. However, the creation information SC2 may include a tag for editing, as in the fourth script SC4 of FIG. 16.

FIG. 23 shows an example of creation information SC2v that includes a tag for editing. This differs from the creation information SC2 of FIG. 14 in the point that a part P22 includes a tag for editing (i.e.,<script>,</script>). An array variable "current_login_user_profile ["login_name"]" described in the part P22 indicates the name of the user logged into the multi-function device 100. The user name is registered in advance in the multi-function device 100. In the case where the user name is a particular name (here, "NAME1"), both "Color" and "Mono" are adopted as the color mode options, and in the case where the user name is not the particular name, only "Mono" is adopted as the color mode option. In the case where the creation information SC2v is analyzed in S1125 of FIG. 11, the internal processing unit 134p creates the edited script by changing the color mode selection option corresponding to the user name. Then, in S1135, in accordance with the script, the controlling unit 132p causes the display unit 140 to display a screen in which the color mode selection options are different corresponding to the user name. Thus, since it is possible to change the processing in the multi-function device 100 by using the creation information SCv2 described in the markup language, it is easy to improve the flexibility of customization of processing in the multi-function device 100. Further, either the target script or the script for controlling the screen is XML format data. Consequently, by changing only the part specified by the predetermined tag without changing the data format, it is possible to easily create screen controlling information from the creation information SCv2, and cause the multi-function device 100 to perform processing.

Further, as described in FIG. 19, in the case where the creation information SC2 cannot be obtained, the controlling unit 132p sends the operation information SC3 to the server 500 (S1147), and receives the sixth script SC6 from the server 500 (S1162). Then, the controlling unit 132p performs the scan process in accordance with the command included in the sixth script SC6 (i.e., the tag <scan>, the tag </scan>, and the value of the elements between the two tags) (S1167). Further, as described in FIG. 11, in the case where the creation information SC2 can be obtained, the controlling unit 132p provides the operation information SC3 to the internal processing unit 134p (S1145). The internal processing unit 134p analyzes the operation information SC3, creates the fifth script SC5 (S1155), and provides the fifth script SC5 to the controlling unit 132p (S1160). The controlling unit 132p performs the scan process in accordance with the command included in the fifth script SC5 (i.e., the tag <scan>, the tag </scan>, and the value of the elements between the two tags) (S1165). Thus, the multi-function device 100 can perform the scan process appropriately by using either the server 500 or the internal processing unit 134p.

Further, as described in FIG. 11, the controlling unit 132p provides the path name indicating the storage location of the creation information SC2 to the internal processing unit 134p (S1115). Then, the internal processing unit 134p obtains the creation information SC2 from the storage location indicated by the path name (S1120), and analyzes the creation information SC2 (S1125). As a result, the internal processing unit 134p can use the creation information SC2 appropriately. However, in a modification, the controlling unit 132p may provide not the path name, but the creation information SC2 itself, to the internal processing unit 134p.

Further, in the case where the item 610, etc. of FIG. 10A is selected, the controlling unit 132p judges whether the activation script SC1 (i.e., the creation information SC2) is obtainable (S1105 of FIG. 11 and FIG. 19). Further, as described in FIG. 21, in the case where the icon image 81 of FIG. 9 is selected, the controlling unit 132p causes the display unit 140 to display the screen D14 of FIG. 22A in accordance with the application corresponding to the icon image 81 (S1137), and performs the copy process (S1169). Thus, the items 610, 620, etc. corresponding to the processes that are a customization target, and the icon image 81 corresponding to the process that is not a customization target, are displayed on the display unit 140. Consequently, the user can select the desired process from among the processes that are customized and the processes that are not customized.

(Other Embodiment of Control Process)

The scan process performed in S1165 of FIG. 11 may be a process of sending scan data to the server 505 connected to the external network GNT in the manner of the scan process based on the sixth script SC6 of FIG. 20. FIG. 24 shows an example of a seventh script SC7 which can be used instead of the fourth script SC4 (see FIG. 16). The difference from the fourth script SC4 is that the element "send_host" is replaced with the element "send_address". The contents of the element "send_address" are described using a tag for editing (i.e., <script>, </script>). Specifically, the part between the start tag <script> and the end tag </script> is replaced with the value of the array variable "current_login_user_profile["email_address"]". The array variable indicates a mail address corresponding to the name of the user logged into the multi-function device 100. The name of the user and the mail address are pre-registered in the multi-function device 100.

In the case where the part P21 of the second script SC2 (see FIG. 14) designates the seventh script SC7, in S1155 of FIG. 11 the internal processing unit 134p analyzes the operation information SC3 and the seventh script SC7, and edits the seventh script SC7 of the process target. The edited script is the same as the sixth script SC6 of FIG. 20, but the value of the element "send_address" is the mail address corresponding to the name of the user logged into the multi-function device 100. In S1165 of FIG. 11, in accordance with the sixth script SC6, the controlling unit 132p sends the scan data to the mail server 505 belonging to the external network GNT.

(Other Embodiment of Control Process)

In S1200, S1220 of FIG. 12, the affirmative determination condition for judging that the activation script (i.e., creation information) is being stored is a first condition "data having the predetermined path name is being stored". However, various other conditions may be adopted instead. For example, the affirmative determination conditions may be to satisfy both the first condition and a second condition "predetermined information is described at head of the data having the predetermined path name". FIG. 25 shows an example of the predetermined information of the second condition. A head part SH of the script SC is an example of the predetermined information. The predetermined information indicates the title "-custom script", a version number, and author (company name). In S1200, S1220 of FIG. 12, the controlling unit 132p judges "YES" in the case where data having the predetermined path name is being stored, and the predetermined information SH is described at the head of the data.

Further, the affirmative determination conditions may include a third condition "electronic signature data for the activation script (e.g., the activation script SC1 of FIG. 13) corresponding to the creation information (e.g., the creation information SC2 of FIG. 14) is obtainable". The electronic signature data is prepared by the author of the plurality of scripts including the activation script and the creation information. The electronic signature data is, e.g., stored in the same directory as the activation script as a different data file from the activation script. Further, the electronic signature data may be embedded in the data file indicating the activation script. In the case where the electronic signature data is obtainable, the plurality of scripts are estimated to be appropriate scripts. Consequently, if the affirmative determination conditions including the third condition are adopted, it is possible to prevent inappropriate customization due to inappropriate scripts.

Further, the affirmative determination conditions may include a fourth condition "electronic signature data for the creation information is obtainable", and a fifth condition "discrete electronic signature data is associated with each respective script of the plurality of scripts, and all the electronic signature data is obtainable". The affirmative determination conditions may be that one or more conditions selected arbitrarily in advance from among the second to fifth conditions, and the first condition, are satisfied. Further, the affirmative determination conditions may include, instead of the first condition, a sixth condition "regardless of directory, data (here, script) having a predetermined file name is being stored".

(Modification)

(1) Various other procedures, instead of the procedures of FIG. 11, FIG. 12, and FIG. 19, may be adopted as the procedures of processes to be customized in accordance with the script. For example, the screen controlling script sent from the server 500 in S1132 of FIG. 19 may be different from the screen controlling script sent from the internal processing unit 134p in S1130 of FIG. 11. That is, the screen displayed in S1135 of FIG. 19 may be a different screen from the screen displayed in S1135 of FIG. 11.

(2) In the embodiments described above, since the plurality of scripts SC1, SC2, SC4 are processed sequentially, the scripts SC1, SC2 other than the script SC4, which is processed last, include information designating the script that is the next process target (called "next designation information" below). Consequently, the controlling unit 132p and the internal processing unit 134p can process the plurality of scripts in the appropriate order by sequentially processing the scripts SC2, SC4 in accordance with the next designation information from the initial script SC1. Here, in the case of creating a script for controlling the screen, the internal processing unit 134p can process the script of the next process target in response to receiving operation information indicating an operation via the screen displayed in response to the script. Instead, a script in which the operation information is used may include a command to wait for reception of the operation information. Further, the plurality of scripts for one single image processing may be described together in one data file.

(3) In the process of FIG. 12, the controlling unit 132p prioritizes the script in the external storage device over the script in the internal storage device. However, instead, the script in the internal storage device may be prioritized over the script in the external storage device. In either case, if the script in the external storage device is to be used, it is preferred that the script is configured such that image processing together with the sending of data to the external network GNT is prohibited. According to this configuration, in the case where an external storage device such as the memory card 300 is used, it is possible to prevent data being sent unintentionally to the external network GNT. Moreover, the multi-function device 100 may be configured such that the user can set whether to use the external network GNT. If not using the external network GNT is set, a request to start the process is not sent to the server 500 even in the case where acquisition of the activation script failed. Thereby, in the case where an external storage device such as the memory card 300 is to be used, it is possible to prevent data being sent unintentionally to the external network GNT even if the user forgets to mount the memory card 300.

(4) The script created by the server 500 may be updated by the program 500d being updated by an administrator of the server 500. For example, the administrator of the server 500 can add a scan data destination by updating the program 500d. When the script stored in the storage device 190 or the memory card 300 is updated, the script created by the internal processing unit 134p is updated even when firmware (e.g., the programs 132, 134) in the non-volatile storage device 130 is not updated. That is, without updating the firmware, the administrator of the multi-function device 100 or the user of the memory card 300 can add the scan data destination by updating the script in the storage device 190 or the memory card 300. In the case where the firmware is updated, it is possible that the multi-function device 100 becomes unable to operate appropriately due to failure of the update. Since the processes are customized by the scripts without updating the firmware, it is possible to prevent occurrence of such a problem.

(5) Instead of XML format, the script of the creation information, etc. may be described in another markup language such as HTML (abbreviation of HyperText Markup Language) format, SGML (abbreviation of Standard Generalized Markup Language) format, etc. Further, the data for customization of the creation information, etc. need not be described in a markup language, but may be described in another format (e.g., a proprietary format of the vendor of the multi-function device 100). For example, instead of data in a text format, such as a script, data in binary format may be adopted.

(6) Position information indicating the storage location of information for customization of the creation information, etc. need not be a path name used in a file system, but may be other information (e.g., a memory address on a storage device).

(7) The image processing of the customization target may be other image processing instead of the scan process described above. For example, at least one of the scan process of S1165 of FIG. 11 and the scan process S1167 of FIG. 19 may be a process for storing the scan data in a storage device (e.g., the storage device 190 or the memory card 300) connected to the multi-function device 100. Further, a copy process may be a customization target.

(8) Various other configurations, instead of the configuration of the multi-function device 100 of FIG. 1, may be adopted as the configuration of the image processing device. For example, the communication I/F 170 may be omitted. In this case, scan data may be stored in the storage device 190 or the memory card 300. Further, in the case where the activation script cannot be obtained, the controlling unit 132p may perform the predetermined standard scan process instead of the process of FIG. 19. Further, the script may be stored in the storage device 130 instead of the storage device 190, and the storage device 190 may be omitted. Further, the storage device to be searched for the script may be only one predetermined device from among the internal storage device and the external storage device. In the case where the internal storage device is the search target, the device I/F 160 may be omitted. Further, either one of the scanner unit 180 and the printer unit 185 may be omitted. Further, a plurality of devices capable of communicating with each other via a network (e.g., a plurality of computers) may each share performing a part of the functions of the image processing device. In this case, the entire plurality of devices may provide the functions of the image processing device. That is, in the present modification, a system comprising a plurality of devices is an example of "image processing device".

(9) In the embodiments described above, at least a part of the configuration realized by hardware may be realized by software. Conversely, at least a part of the configuration realized by software may be realized by hardware. For example, at least a part of the functions realized by the programs 132, 134 of FIG. 1 may be realized by a dedicated hardware circuit having a logic circuit.

(10) In the case where the functions of the multi-function device 100 are realized by a computer program, the program may be provided in a state of being stored in a computer-readable recording medium (e.g., a non-temporary recording medium). The computer-readable recording medium is not limited to a portable recording medium such as a memory card, CD-ROM, etc., but may be an internal storage device in the computer, or an external storage device such as a hard disk drive.

(Correspondence Relationship)

The state in which the process of FIG. 11 is performed, and the state in which the process of FIG. 19 is performed are examples of "connection state" and "non-connection state", respectively. The menu screen of FIG. 9 is an example of "first item selection screen" and "second item selection screen". The icon image 82 is an example of "first item image" and "second item image". The "SCAN to E-mail" function and "SCAN to PC" function linked with the server 500 are examples of "first function" and "second function", respectively. The scripts SC1, SC2, SC4 stored in the memory card 300 are an example of "first program control data" and, in those scripts SC1, etc., the part defining the style of screen (e.g., "screen title" in SC2), and the part defining the text and image (e.g., "button label="start"" in SC2) are examples of "first screen constitution data" and "first information data", respectively. The server 500, and the script SC2 of FIG. 19 are examples of "external server" and "screen display data", respectively. The screen D12 of FIG. 18A is an example of "function related screen which is related to the first function" and "function related screen which is related to the second function".

Third Embodiment

In the present embodiment, the information data ID1 in the storage device 130 (see FIG. 2) includes icon data shown in FIG. 26, and icon data shown in FIG. 27. The plurality of icon data of FIG. 26 corresponds to the plurality of basic functions which can be performed by the multi-function device 100. Each of the plurality of icon data represents a combination of an operation symbol (i.e., document symbol, scanner device symbol, FAX device symbol, print device symbol) indicating a corresponding basic function, and a color symbol indicating a color option (i.e., "C/M", "C", "W").

The plurality of icon data of FIG. 27 corresponds to a plurality of destinations of the scan data. Each of the plurality of icon data represents a destination for causing the user to recognize the corresponding destination (i.e., USB memory symbol, cloud image symbol, FTP image symbol, email image symbol, and PC image symbol).

(Process at Time of Power ON)

When the power of the multi-function device 100 is turned ON, the processor 110 performs the following process. That is, in the case where the storage device 190 or the memory card 300 is not connected, the processor 110 causes the display unit 140 to display the screen of FIG. 9 using the plurality of icon data of FIG. 26. Specifically, by using four pieces of icon data corresponding to four basic functions, the processor 110 creates screen data representing the icon images 81 to 84, excluding the color symbol indicating the color options, and provides the screen data to the display unit 140. In particular, the processor 110 creates the screen data such that each name image indicating the name of each basic function is located adjacent to the icon images 81 to 84. As a result, the menu screen of FIG. 9 is displayed on the display unit 140.

Further, in the case where the storage device 190 or the memory card 300 is connected, and the control data (e.g., CD2, CD3 of FIG. 3) is being stored in the storage area 190 or 300, the processor 110 causes the display unit 140 to display a screen different from the screen of FIG. 9 in accordance with the control data (called "target control data" below). In particular, in the present embodiment, it is assumed that the target control data does not designate information data representing an icon image to be added to the menu screen. Then, the processor 110 analyzes the target control data, and can cause the display unit 140 to display the menu screen including the icon images indicating the function designated by the target control data (called "custom function" below).

Specifically, the processor 110 first analyzes the target control data, and specifies a basic function (called "target basic function" below) designated by the target control data. For example, in the case where the target control data includes or designates the scripts SC1, SC2, SC4, SC5 (see FIG. 13, etc.), the processor 110 sequentially analyzes the scripts SC1, SC2, SC4, SC5, and can find the scan tag (i.e., <scan>) included in the script SC4 (see FIG. 16). In this case, the processor 110 specifies that the target basic function is the scan function. Further, the processor 110 specifies that the target basic function is the FAX function in the case where the target control data includes a FAX tag (i.e., <FAX>), specifies that the target basic function is the copy function in the case where the target control data includes a copy tag (i.e., <copy>), and specifies that the target basic function is the print function in the case where the target control data includes a print tag (i.e., <print>).

Next, the processor 110 specifies the color option designated by the target control data (called "target color option" below). For example, the processor 110 can find the element "ColorMode" indicating the color mode included in the script SC2 (see FIG. 14), and can know that the character string described in that element includes both "Color" and "Mono". In this case, the processor 110 specifies that the target color option is both color and monochrome. Further, the processor 110 specifies that the target color option is only color in the case where the character string includes only "Color", and specifies that the target color option is only monochrome in the case where the character string includes only "Mono".

Next, in the case where the target basic function is the scan function, the processor 110 further specifies the destination option (called "target destination option" below) designated by the target control data. For example, the processor 110 can find the element "send host" indicating the destination included in the script SC5. In this case, the processor 110 specifies that the target destination option is the PC or the FTP server. Then, the processor 110 specifies that the target destination option is the PC in the case where the name described in that element matches the host name of the PC pre-registered in the multi-function device 100, and specifies that the target destination option is the FTP server in the case where the names do not match. Further, e.g., in the case where the target control data includes or designates the script SC6 of FIG. 20, the processor 110 analyzes the script SC6, and can find the element "send_address" indicating the destination included in the script SC6. In this case, the processor 110 specifies that the target destination option is "E-Mail". Further, the processor 110 specifies that the target destination option is the cloud in the case where the target control data includes the element "send_URL", and specifies that the target destination option is the USB in the case where the target control data includes the element "send_USB".

Moreover, in a modification, the target control data may include an element indicating a communication protocol for sending the scan data. In this case, the processor may specify the target destination option based on the communication protocol.

As described above, the processor 110 can specify the custom function by specifying the combination of target basic function, target color option, and target destination option. Next, the processor 110 selects one icon data, from among the plurality of icon data of FIG. 26, corresponding to the combination of target basic function and target color option. Then, the processor 110 creates screen data representing the icon images 81 to 84 of FIG. 9, and icon images represented by the selected icon data (called "custom icon image" below), and provides the screen data to the display unit 140. In particular, the processor 110 creates the screen data such that a name image indicating the name of each basic function is located adjacent to each icon image, and a name image indicating the combination of the name of the target basic function and the name of the target destination option is located adjacent to the custom icon image. Further, the processor 110 creates the screen data such that a mark indicating that it is a custom icon image is located adjacent to the custom icon image. Further, the processor 110 creates the screen data such that, among the icon images 81 to 84, the icon images corresponding to the target basic functions, and the custom icon images, are located adjacent to one another. As a result, e.g., the menu screen of FIG. 29 is displayed on the display unit 140.

Figure 29:
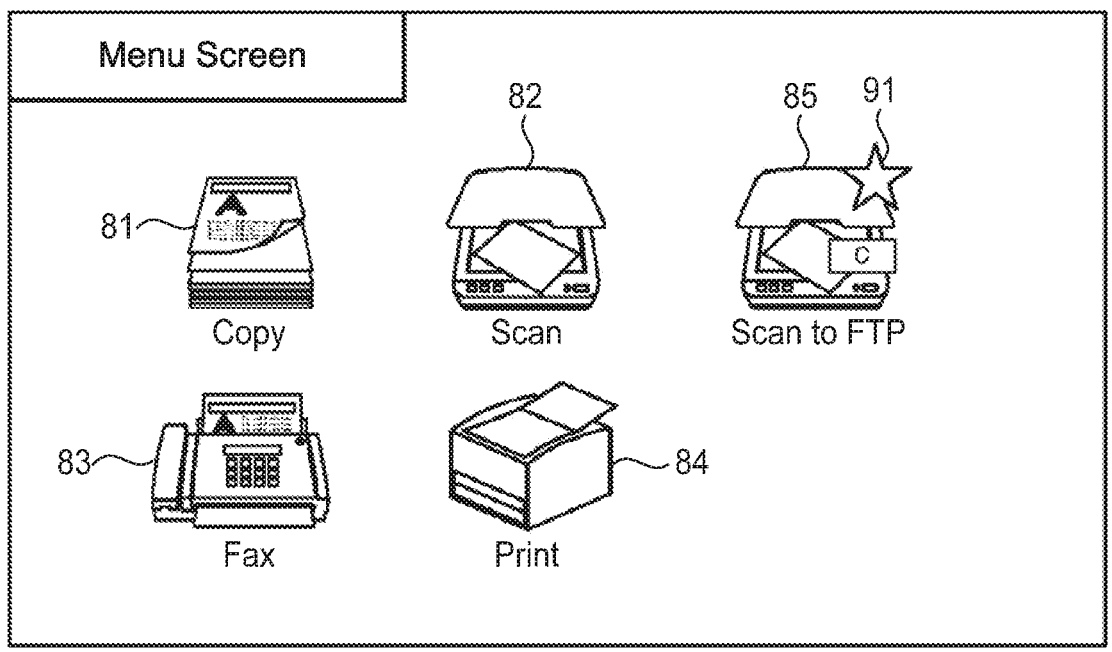
FIG. 29 shows a menu screen that includes a custom icon image.

The menu screen of FIG. 29 shows an example of a screen displayed in the case where the target basic function is the scan function, the target color option is only color, and the target destination option is FTP. A custom icon image 85 indicates that the target basic function is the scan function, and the target color option is color. The custom icon image 85 includes a mark "C" indicating that the target color option is color. That is, this mark indicates the function performance condition (i.e., scan condition) to be used by the multi-function device 100 at the time of performing the "SCAN to FTP" function. Consequently, the user can easily know the function performance condition by looking at the custom icon image 85. Further, the name image showing "SCAN to FTP", which is the combination of the name of the target basic function and the name of the target destination option, is located adjacent to the custom icon image 85. Consequently, the user can easily know which function the custom icon image 85 corresponds to by looking at the name image. Further, a mark 91 indicating a custom icon image is located adjacent to the custom icon image 85. Consequently, the user can easily know that the icon image 85 corresponds to a customized function by looking at the mark 91. Further, the icon image 82 corresponding to the scan function, which is a target basic function, and the custom icon image 85, are located adjacent to one another. Consequently, the user can easily distinguish the two icon images 82, 85 corresponding to the same basic function, and the other icon images 81, etc. corresponding to the other basic functions.

(Process When Icon Image is Selected on Menu Screen of FIG. 9)

Figure 28:
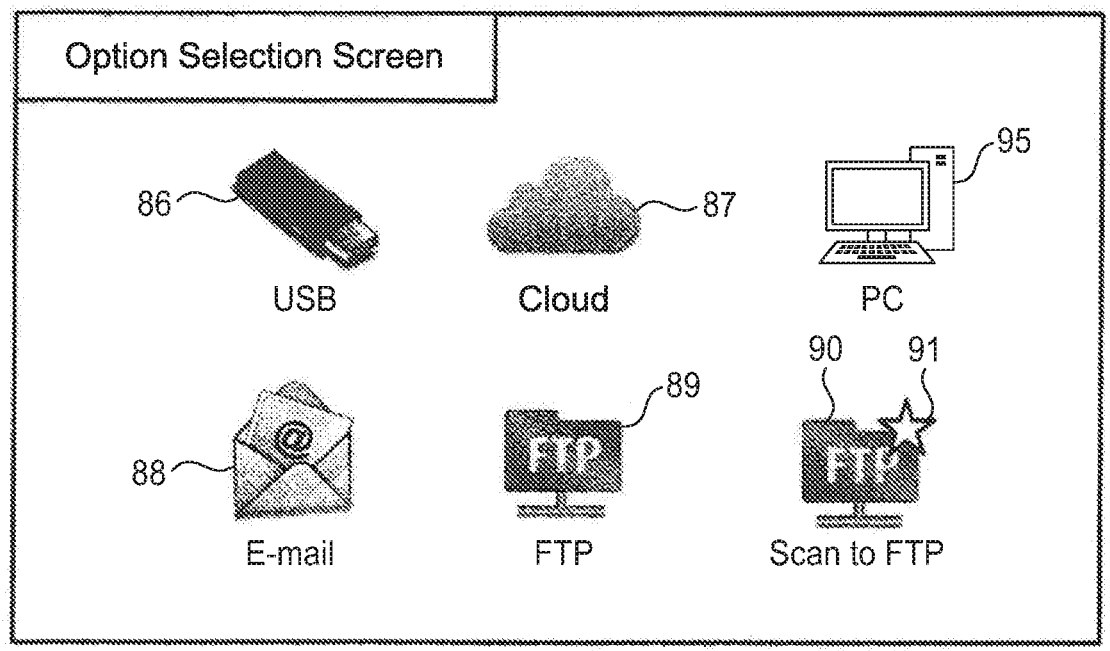
FIG. 28 shows an option selection screen.

For example, when the icon image 82 in the menu screen of FIG. 9 is selected, the processor 110 uses the plurality of icon data of FIG. 27 to display, instead of the screen of FIG. 10A, an option selection screen in which the images 90, 91 have been removed from the screen of FIG. 28, i.e., an option selection screen including the icon images 86 to 89, 95. Then, in the case where any of the icon images 86 to 89, 95 is selected, the processor 110 activates the corresponding application, and performs the scan process. For example, the processor 110 activates the application AP1 and realizes the "SCAN to PC" function in the case where the icon image 95 is selected, and activates the application AP2 and performs the "SCAN to FTP" function in the case where the icon image 89 is selected. Further, in the case where another icon image 86, etc. is selected, the processor 110 activates a corresponding application (not shown), and performs a corresponding function.

(Process When Icon Image is Selected on Menu Screen of FIG. 29)

In the present embodiment, the target control data designates information data (e.g., ID2b of FIG. 3) representing a screen (called "particular screen" below) the same as the screen D4 of FIG. 10D. The particular screen is the same as the screen D4 except for the point that "FTP" is used instead of "A&B" as the scan data destination. Consequently, when the custom icon image 90 is selected in the menu screen of FIG. 29, the processor 110 activates the application AP2, performs the "SCAN to FTP" function and, further, causes the display unit 140 to display the particular screen.

Further, e.g., when the icon image 82 is selected in the menu screen of FIG. 29, the processor 110 uses the plurality of icon data of FIG. 27 to display, instead of the screen of FIG. 10A, the option selection screen of FIG. 28, i.e., the option selection screen including the icon images 86 to 90, 95. The option selection screen of FIG. 28 is displayed in the case where the target basic function is the scan function, and the target destination option is FTP. Since the target destination option is FTP, the processor 110 selects one piece of icon data corresponding to FTP from among the plurality of pieces of icon data of FIG. 29. Then, the processor 110 creates screen data representing the five icon images 86 to 89, 95 represented by the plurality of pieces of icon data of FIG. 28, and the icon image 90 represented by the selected icon data (called "custom icon image" below), and provides the screen data to the display unit 140.

In particular, the processor 110 creates the screen data such that name images indicating the names of destinations are located adjacent to the icon images 86 to 91, 95, and the name image indicating the name "SCAN to FTP" of the target destination option is located adjacent to the custom icon image 90. Consequently, the user can easily know which function the custom icon image 90 corresponds to by looking at the name image. Further, the processor 110 creates the screen data such that the mark 91 indicating a custom icon image is located adjacent to the custom icon image 90. Consequently, the user can easily know that the icon image 90 corresponds to a customized function by looking at the mark 91. The mark 91 is the same as the mark 91 of FIG. 29. Consequently, the user can easily know that the icon image 85 on the screen of FIG. 29 and the icon image 90 on the screen of FIG. 28 are the same customized function (i.e., "SCAN to FTP" function). Further, the processor 110 creates the screen data such that the icon image 89 corresponding to the target destination option, and the custom icon image 90, are located adjacent to one another. Consequently, the user can easily distinguish the two icon images 89, 90 corresponding to the same destination option, and the other icon images 86, etc. corresponding to the other destination options.

Then, in the case where any of the icon images 86 to 90, 95 is selected, the processor 110 activates the corresponding application, and performs the scan process. Further, when the custom icon image 90 is selected, the processor 110 activates the application AP2, performs the "SCAN to FTP" function, and further causes the display unit 140 to display the particular screen.

(Modifications)

(1) The custom function is not limited to "SCAN to FTP" function, but may be another function (e.g., "SCAN to USB" function). Further, the custom function may include a basic function different from the scan function. For example, in the case where the custom function designated by the target control data is a color copy function, the processor 110 may cause the display unit 140 to display a menu screen including a custom icon image 93, as shown in FIG. 30B.

Figure 30A:
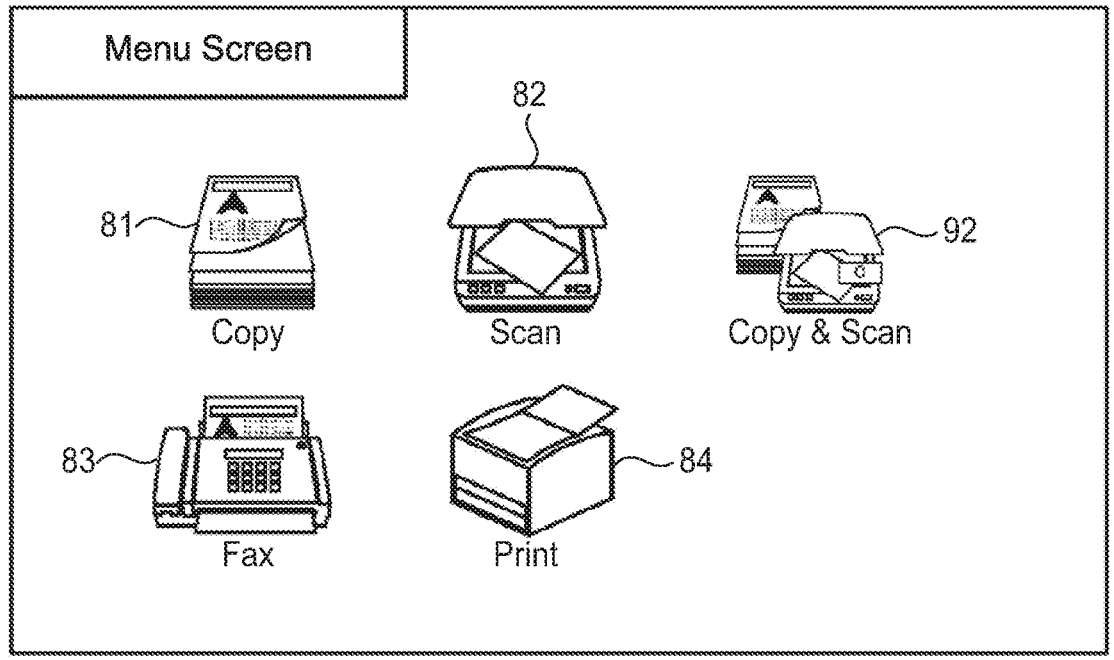
FIG. 30A and FIG. 30B show menu screens of modifications.
Figure 30B:
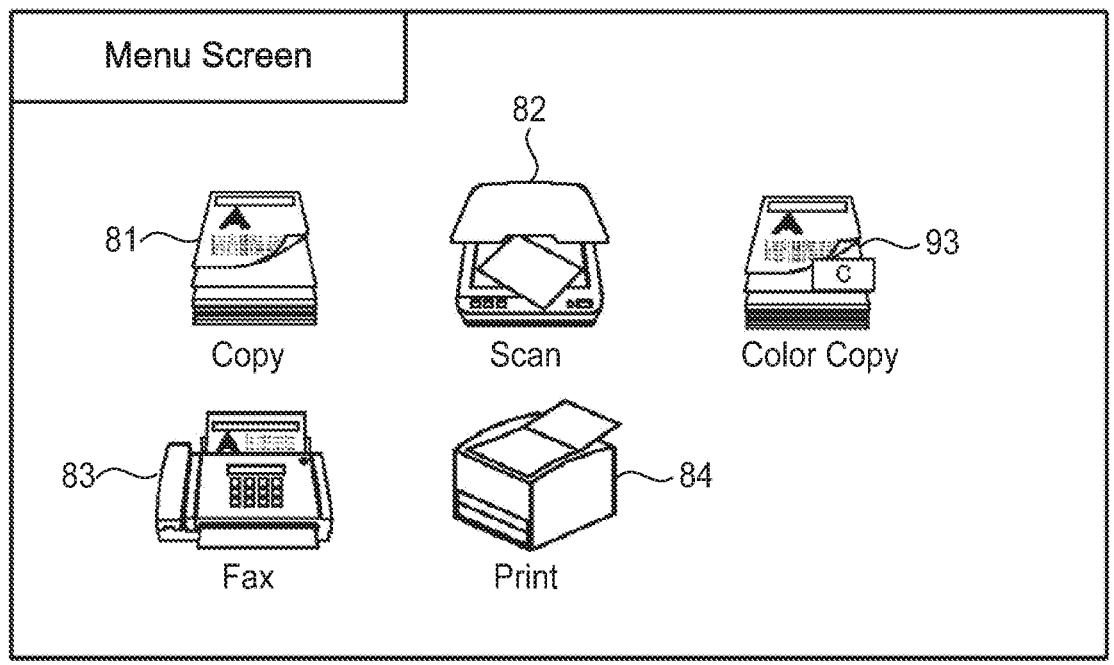

(2) Further, in the case where the custom functions designated by the target control data designate both the "SCAN to FTP" function and the color copy function, the processor 110 may cause the menu screen of FIG. 29 and the menu screen of FIG. 30B to be displayed alternately.

(3) The number of basic functions included in the custom functions is not limited to one. For example, the custom functions designated by the target control data may include the copy function and scan function, to be performed sequentially. In this case, as shown in FIG. 30A, the processor 110 may cause the display unit 140 to display a menu screen including a custom icon image 92. The custom icon image 92 corresponds to a combination of the icon image 81 corresponding to the copy function, and the icon image 82 corresponding to the scan function. The custom icon image 92 has each of the icon images 81, 82 superimposed. However, instead, the icon images 81, 82 may be not be superimposed, but adjacent to one another.

Figure 31A:
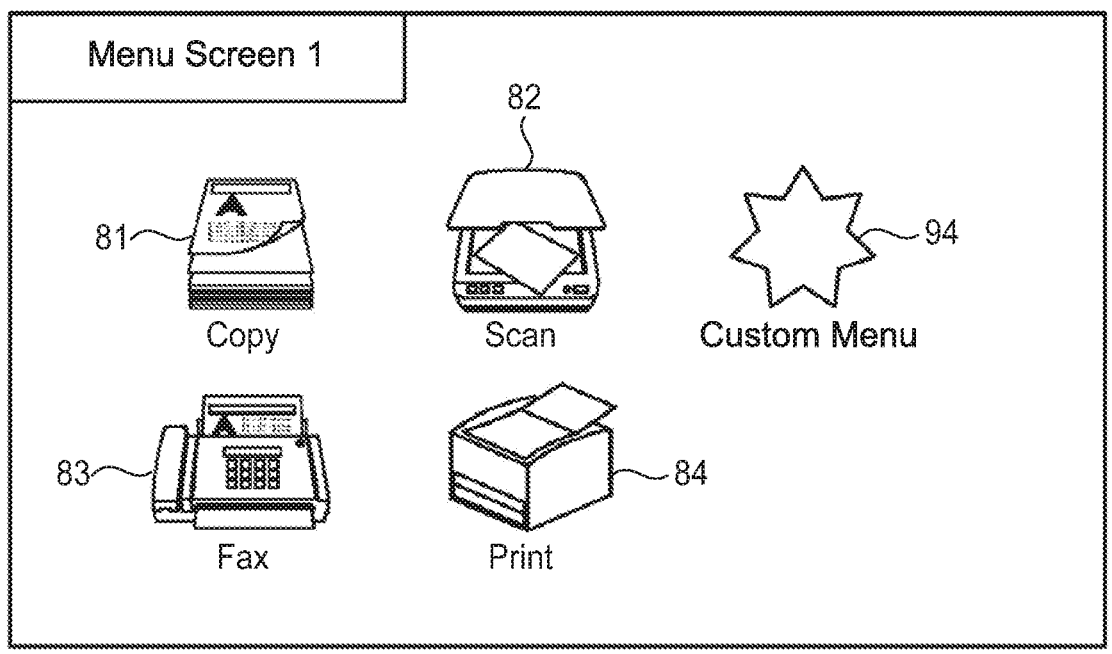
FIG. 31A and FIG. 31B show menu screens of modifications.
Figure 31B:
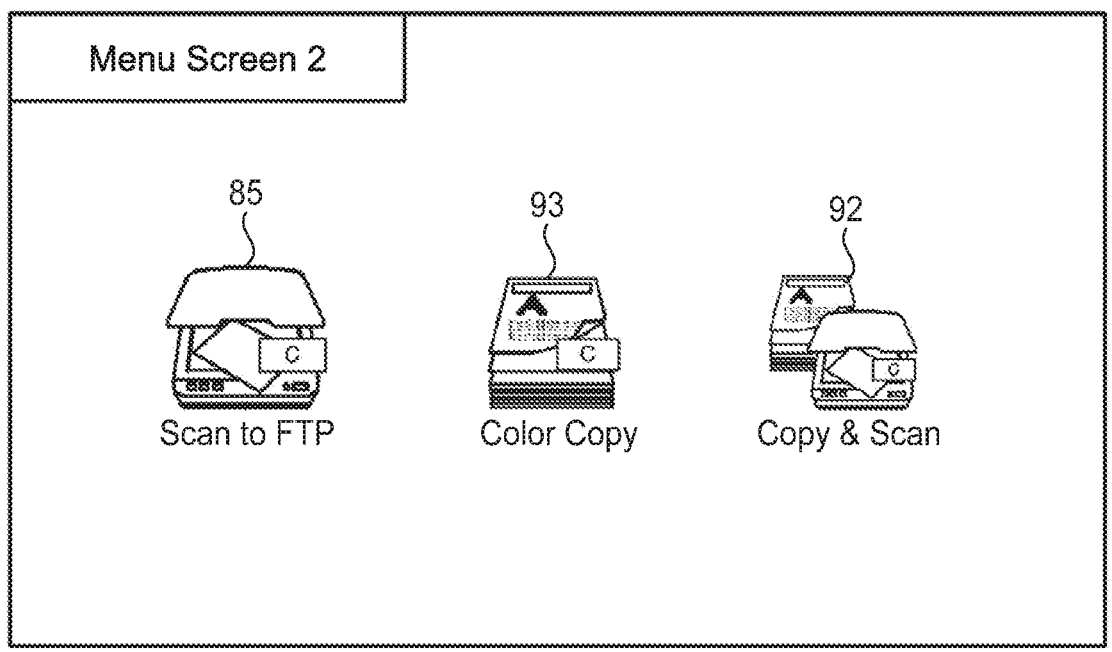

(4) The processor 110 may cause the display unit 140 to display a menu screen 1 of FIG. 31A. Then, in the case where an icon image 94 is selected, the processor 110 may specify one or more custom functions designated by the target control data, and cause the display unit 140 to display a menu screen 2 (see FIG. 31B) including the one or more custom icon images 85, 92, 93 corresponding to the one or more custom functions.

(Correspondence Relationship)

The plurality of icon data of FIG. 26 is an example of "N1 pieces of information data". The menu screen of FIG. 9, the menu screen of FIG. 29, and the option selection screen of FIG. 28 are examples of "first item selection screen", "second item selection screen" and "third item selection screen", respectively. The custom icon image 85 of FIG. 29, the icon image 82, and the custom icon image 90 of FIG. 28 are examples of "second item image", "particular item image" and "fourth item image", respectively. Mark "C", and mark 91 included in the custom icon image 85 of FIG. 29 are examples of "mark indicating a function performance condition" and "indicating that each of the second item image and the fourth item image corresponds to the same function", respectively. The particular screen (i.e., the screen indicating "FTP" as the destination in FIG. 10D) is an example of "function related screen which is related to the second function".

The invention claimed is:

1. An image processing device comprising;
a display;
an operation unit;
a processor; and
a first storage device configured to store a plurality of application programs for providing a plurality of functions related to an image processing, and store computer-readable instructions,
wherein the computer-readable instructions, when executed by the processor, cause the image processing device to perform:
determining whether a storage device that stores program control data for a function corresponding to a selected image is connected to the processor;
activating a first application program for providing a first function corresponding to a first item image among the plurality of application programs, in a case where the first item image is selected by a user via the operation unit from among N1 pieces of item images included in a first item selection screen displayed on the display, in response to a determination of a non-connection state in which the storage device that stores program control data is not connected to the processor, the N1 being an integer equal to 1 or more;
obtaining screen display data from an external server in accordance with the first application program, in a case where the first item image is selected when the non-connection state is determined;
causing the display to display a first function related screen which is related to the first function by using the screen display data;
executing image processing corresponding to the first function, in a case where the first function related screen is operated by the user via the operation unit;
causing the display to display a second function related screen which is related to a second function without execution of a communication with the external server in a case where a second item image is selected by the user via the operation unit from among N2 pieces of item images included in a second item selection screen displayed on the display, in response to a determination of a connection state in which the storage device that stores first program control data is connected to the processor, the first program control data designating a first screen constitution data and a first information data, the second function related screen having a first style according to the first screen constitution data and including a particular information image according to the first information data, the storage device being a storage device connected to the processor for providing the second function, the second function being different from the first function, the N2 being an integer equal to or more than 1;
activating a second application program for providing the second function among the plurality of application programs, in a case where the second function related screen is operated by the user via the operation unit, the second application program being designated by the first program control data; and
executing image processing corresponding to the second function according to the second application program.

2. The image processing device as in claim 1, wherein the first program control data is described by a markup language.

3. The image processing device as in claim 1, wherein the first program control data is described by a script language for branching a process in according with an item image selected by the user.

4. The image processing device as in claim 1, wherein the computer-readable instructions, when executed by the processor, cause the image processing device to further perform:
activating a third application program for providing a third function corresponding to a third item image among the plurality of application programs, in a case where the third item image is selected by the user via the operation unit from among the N2 pieces of item images included in the second item selection screen displayed on the display when the connection state is determined, the third item image being an image that the first program control data is not to be used.

5. The image processing device as in claim 1, further comprising a scanner unit, wherein
in a case where the image processing device belongs to an internal network, the first function includes:
causing the scanner unit to perform a scan of a document and create first image data; and sending the first image data obtained by the scan to a first device which belongs to an external network being connected to the internal network,
in a case where the image processing device belongs to the internal network, the second function includes causing the scanner unit to perform a scan of a document and create second image data; and sending the second image data obtained by the scan to a second device which belongs to the internal network.

6. The image processing device as in claim 1, wherein the storage device is an external storage device to be attached to the image processing device in a detachable manner.

7. The image processing device as in claim 1, wherein the storage device is an internal storage device being pre-mounted on the image processing device.

8. The image processing device as in claim 1, wherein the first item selection screen is same as the second item selection screen; and
the first item image is same as the second item image.

9. A non-transitory computer-readable recording medium storing computer-readable instructions for an information processing device,
the information processing device comprising:
a display;
an operation unit;
a processor; and
a first storage device configured to store a plurality of application programs for providing a plurality of functions related to an image processing,
wherein the computer-readable instructions, when executed by the processor, cause the information processing device to perform:
determining whether a storage device that stores program control data for a function corresponding to a selected image is connected to the processor;
activating a first application program for providing a first function corresponding to a first item image among the plurality of application programs, in a case where the first item image is selected by a user via the operation unit from among N1 pieces of item images included in a first item selection screen displayed on the display, in response to a determination of a non-connection state in which the storage device that stores program control data is not connected to the processor, the N1 being an integer equal to 1 or more;
obtaining screen display data from an external server in accordance with the first application program, in a case where the first item image is selected when the non-connection state is determined;
causing the display to display a first function related screen which is related to the first function by using the screen display data;
executing image processing corresponding to the first function, in a case where the first function related screen is operated by the user via the operation unit;
causing the display to display a second function related screen which is related to a second function without execution of a communication with the external server in a case where a second item image is selected by the user via the operation unit from among N2 pieces of item images included in a second item selection screen displayed on the display, in response to a determination of a connection state in which the storage device that stores first program control data is connected to the processor, the first program control data designating a first screen constitution data and a first information data, the second function related screen having a first style according to the first screen constitution data and including a particular information image according to the first information data, the second storage device being a storage device connected to the processor for providing the second function, the second function being different from the first function, the N2 being an integer equal to or more than 1;
activating a second application program for providing the second function among the plurality of application programs, in a case where the second function related screen is operated by the user via the operation unit, the second application program being designated by the first program control data; and
executing image processing corresponding to the second function according to the second application program.

10. The non-transitory computer-readable recording medium as in claim 9, wherein
the first item selection screen is same as the second item selection screen; and
the first item image is same as the second item image.

* * * * *

UNITED STATES PATENT AND TRADEMARK OFFICE
CERTIFICATE OF CORRECTION

PATENT NO. : 10,616,433 B2
APPLICATION NO. : 15/007384
DATED : April 7, 2020
INVENTOR(S) : Sadaaki Miyazaki It is certified that error appears in the above-identified patent and that said Letters Patent is hereby corrected as shown below:

In the Claims

Column 36, Claim 9, Line 15 should read:
the first information data, the storage device Signed and Sealed this
Nineteenth Day of January, 2021

Andrei Iancu
*Director of the United States Patent and Trademark Office*